MULTICHANNEL COMMUNICATION SYSTEM

Filed March 18, 1964

INVENTOR
George A. Whitlow

BY
ATTORNEYS

INVENTOR
George A. Whitlow
BY E. Hastings Ackley and Walter J. Jason
ATTORNEYS

INVENTOR
George A. Whitlow

BY Ed Hastings Ackley and Walter J. Jaeger
ATTORNEYS

April 1, 1969 G. A. WHITLOW 3,436,484

MULTICHANNEL COMMUNICATION SYSTEM

Filed March 18, 1964 Sheet 4 of 4

INVENTOR
George A. Whitlow

BY E. Hastings Ackley
and
Walter J. Jayne
ATTORNEYS

United States Patent Office 3,436,484
Patented Apr. 1, 1969

3,436,484
MULTICHANNEL COMMUNICATION SYSTEM
George A. Whitlow, Euless, Tex., assignor to Consolidated Electronics Corporation, Dallas, Tex., a corporation of Texas
Filed Mar. 18, 1964, Ser. No. 352,917
Int. Cl. H04j *1/08*
U.S. Cl. 179—15 17 Claims

ABSTRACT OF THE DISCLOSURE

A communication system having a transmitter providing a plurality of input channels and means for sequentially modulating consecutive half cycles of a carrier frequency with the signals from the input channels in predetermined sequence and a receiver having means for demodulating the carrier wave and transmitting the signals of the output channels to predetermined output channels of the receiver.

This invention relates to communication systems and more particularly to a communication system for simultaneously transmitting and receiving a plurality of signals by means of a single carrier wave.

An object of this invention is to provide a new and improved communication system including a transmitter having a plurality of input channels and a receiver having a plurality of output channels wherein the signals of the input channels modulate sequentially consecutive half cycles of the carrier wave which is transmitted to the receiver, the receiver having means for demodulating the carrier wave and transmitting the signals of the output channels of the transmitter to corresponding output channels of the receiver.

Another object is to provide a communication system wherein the transmitter is provided with means for transmitting a synchronizing signal by means of the carrier wave to the receiver to insure transmittal of the signal of each input channel to its associated or corresponding receiver output channel.

Still another object is to provide a communication system wherein the band width of each information channel is relatively great for any given frequency of the carrier wave.

Still another object is to provide a communication system wherein the modulated carrier wave transmitted to the receiver is of sine wave form to reduce noise and attenuation of the transmitted signals during the transmission thereof from the transmitter to the receiver.

A further object is to provide a new and improved transmitter having a plurality of input channels, means for generating a basic frequency switch means operatively associated with the input channels and controlled by the basic frequency for modulating consecutive half cycles of consecutive sampling pulses provided by the basic frequency by signals of the several input channels in predetermined consecutive order, and mixer means for converting the modulated sampling pulses into a modulated carrier wave whereby if a given number of input channels are provided, for example twenty (20), consecutive trains of ten cycles each of the carrier wave have consecutive half cycles thereof modulated by the signals of consecutive input channels in a predetermined sequence.

A still further object is to provide a transmitter wherein the switch means includes a ring switch for placing in open condition in predetermined step by step sequence consecutive pairs of and gates of a matrix or commutator which consecutively connect the input channels to means for modulating consecutive sampling pulses with the signals of consecutive input channels.

Another object is to provide a transmitter wherein a modulating means is associated with each input channel whose output is transmitted through a filter for filtering the output of the modulating means and converting it into sine wave form whereby spurious harmonics caused by ringing of each filter due to the modulation of a sampling pulse of one train of the sampling pulses corresponding to one train of the carrier wave decays before the next modulated sampling pulse is transmitted to the filter.

Still another object is to provide a receiver having a plurality of output channels, demodulating means and switch means for transmitting signals or information carried by half cycles of the carrier wave in predetermined sequence to the consecutive output channels.

Still another object is to provide a receiver wherein the switch means is provided with means for detecting a synchronizing signal transmitted by the carrier wave to cause each train of half cycles of the carrier wave to be transmitted to consecutive output channels in predetermined sequence and order.

Additional objects and advantages of the invention will be readily apparent from the reading of the following description of a device constructed in accordance with the invention, and reference to the accompanying drawings thereof, wherein.

Figure 1:
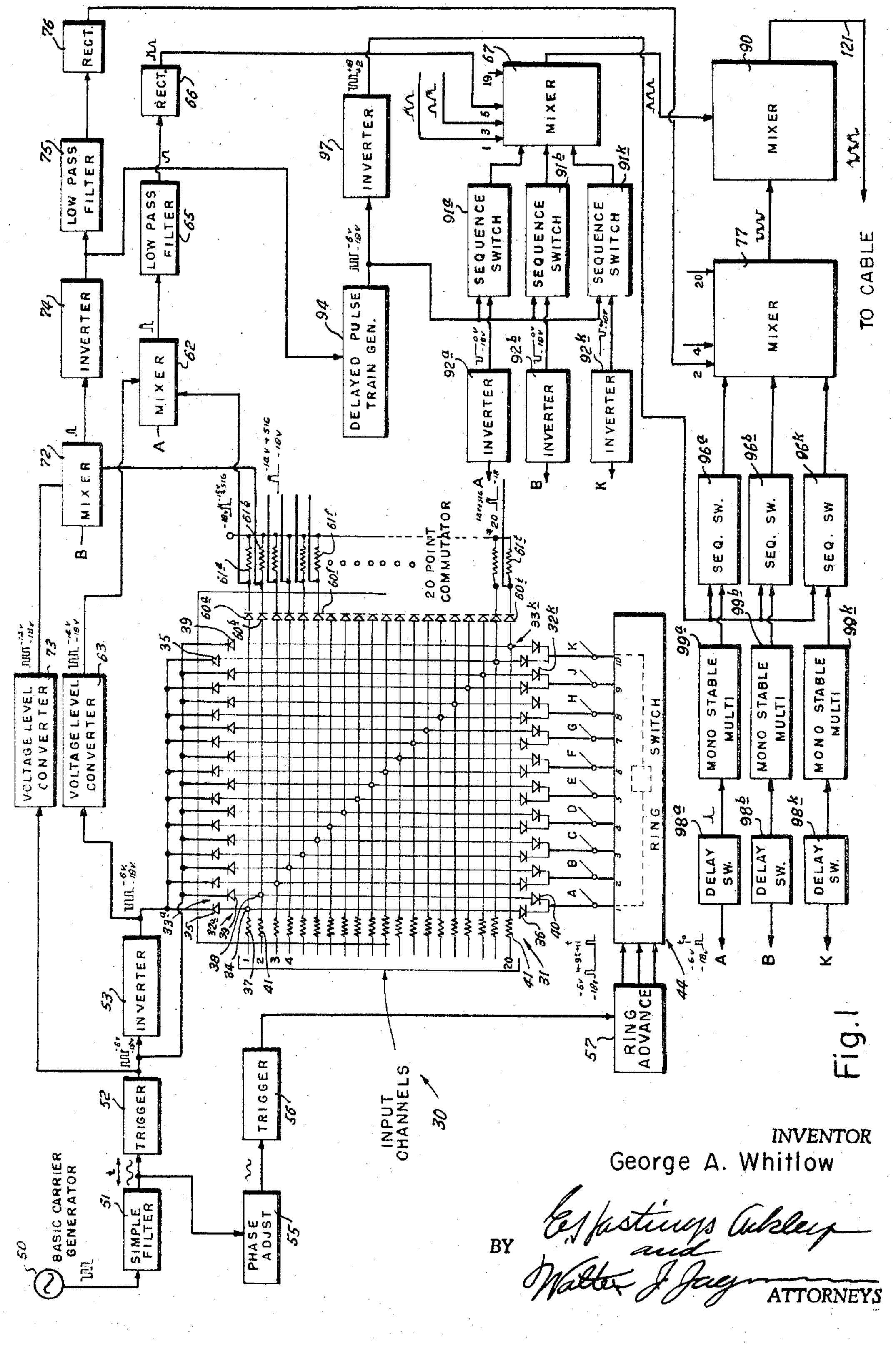
FIGURE 1 is a block diagram of the circuit of the transmitter of the communication system embodying the invention.
Figure 2:
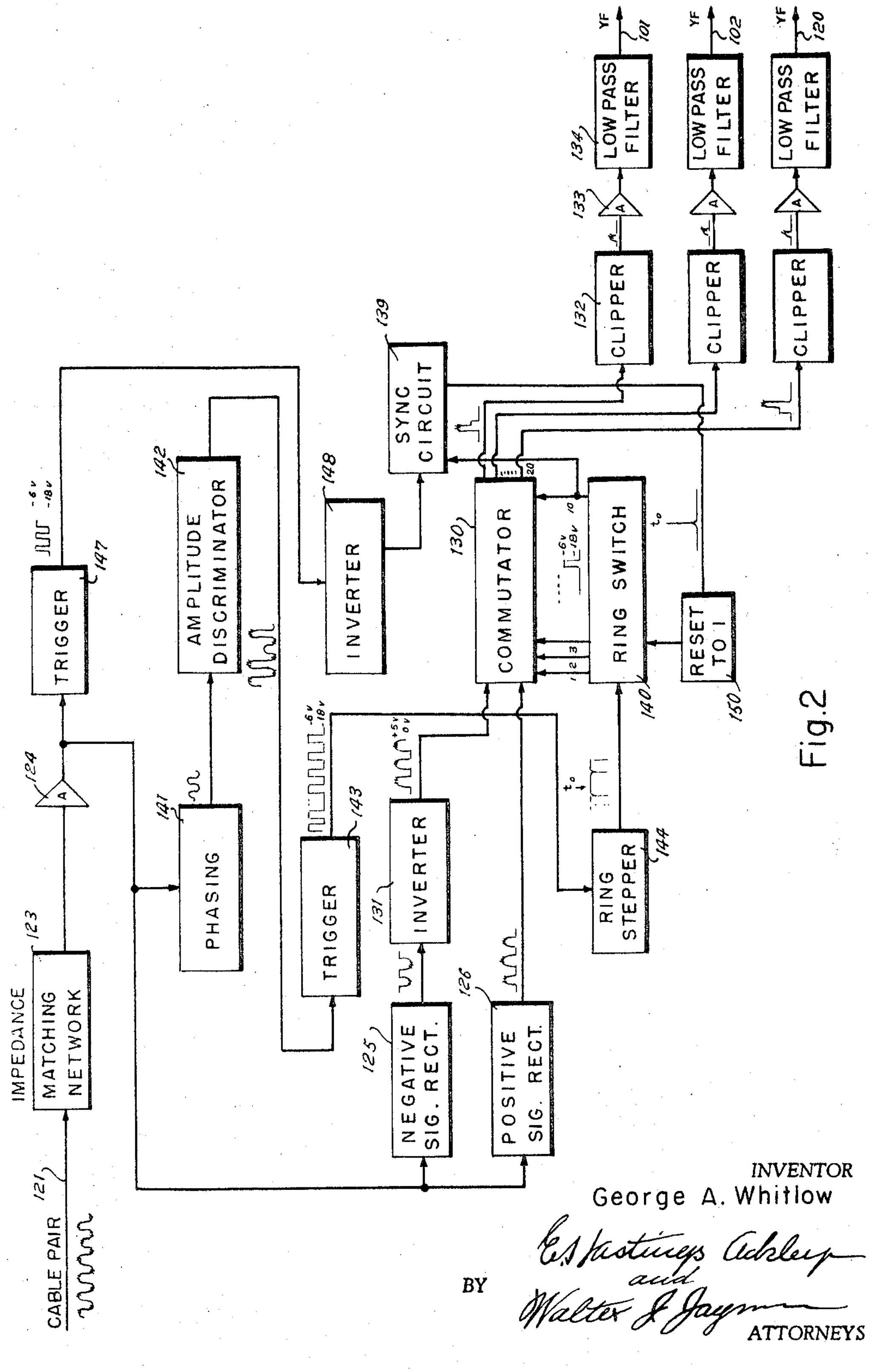
FIGURE 2 is a block diagram of the circuit of the receiver of the communication system.

Referring now particularly to FIGURE 1 of the drawing, each of the input channels 1–20 of the transmitter 30 is connected to one And gate of a matrix or commutator 31 formed of ten pairs of And gates 32*a–k* and 33*a–k*, respectively. Each odd number channel 1, 3, 5 . . . 19 is connected to the common connection 34 of a pair of diodes 35 and 36 of its associated And gate 32 through a resistance 37. Each even numbered channel 2, 4, 6 . . . 20, is connected to the common connection 38 of the diodes 39 and 40 of its associated And gate 33 through a resistance 41. The diodes 36 and 40 of each pair of And gates 32*a–k* and 33*a–k* are connected to the output conductors A–K, respectively, of the ring switch 44.

The output of the basic frequency generator 50 of the transmitter is applied simultaneously to the diodes 35 of the And gates 32 through a filter 51, a trigger 52 which converts the sign wave output of the filter 51 to a square wave form of predetermined amplitude, for example, an amplitude of −6 volts to −18 volts, and an inverter 53. The output of the basic frequency generator is simultaneously applied to the diodes 39 of the And gates 33 through the filter 51 and the trigger 52 without passing through the inverter 53 so that whenever the diodes 35 of the And gates 32 have applied thereto during one half cycle of the basic frequency a predetermined voltage, for example −18 volts, the diodes 39 of the And gates 33 have applied thereto during such half cycle a voltage of another predetermined value, for example −6 volts. During the succeeding half cycle of the basic frequency, the voltages applied to the diodes 35 and 39 are reversed, the diodes 35 having −6 volts applied thereto and the diodes 39 having −18 volts applied thereto.

The ring switch applies a predetermined voltage, for example −6 volts, sequentially to each of its output conductors A–K during consecutive cycles of the basic frequency, so that one output conductor during any given cycle applies a voltage of −6 volts to the diodes 36 and 40 to which it is connected while the other nine output conductors apply another predetermined voltage, for example −18 volts, to the diodes 36 and 40 to which they are connected. The operation of the ring switch is controlled by the basic frequency output of the generator 50 which is transmitted to the ring switch through the filter 51, a phase adjusting circuit 55, a trigger 56 which changes the sine wave output of the phase adjusting circuit into square wave form and a ring advance circuit 57.

It will be apparent that when the ring switch causes −6 volts to be applied to the diodes 36 and 40 of the first pair of And gates **32*a* and 33*a*, the voltage of −18 volts is applied to the diodes 36 and 40 of the other eighteen And gates of the commutator 31 so that all the other And gates 32*b–k* and 33*b–k* remain closed during such cycle of the basic frequency output of the generator. The And gate 32*a* will be open during the first half of this cycle since the voltage of −6 volts is now applied to its diode 35 while the And gate 33*a* remains closed since the voltage of −18 volts is now applied to its diode during this first half cycle. During the next half of this cycle, the voltage of −6 volts is still applied to the diodes 36 and 40 of the And gates 32*a* and 33*a* and the And gate 33*a* is open while the And gate 32*a* is closed since a voltage of −6 volts is now applied to the diode 39 and a voltage of −18 volts is applied to the diode 35 of the And gate 32*a*. During the next full cycle of the basic frequency, a voltage of −6 volts is applied to the diodes 36 and 40 of the And gates 32*b* and 33*b*, the And gate 32*b* being open during the first half of this next cycle while the And gate 33*b* is closed and the And gate 33*b* being open while the And gate 32*b* is closed during the last half of this second cycle. The ring switch thus causes the And gates of the twenty input channels 1–20** to be successively open during consecutive half cycles of each train of ten cycles of the basic frequency output of the generator.

The signal input of the channel No. 1 of the transmitter, when the And gate **32*a* is open, is transmitted from the common connection of a diode 60*a* and a resistance 61*a* to a mixer 62 to which is also transmitted the output of the voltage level converter 63 which changes the amplitude of the inverter 53 to a desired range, for example between −14 volts and −18 volts. The operation of the mixer 62 is controlled by the ring switch to whose output conductor A the mixer is connected. The mixer 62, during the cycle of each train of ten cycles during which voltage of −6 volts is applied by the output conductor A to the diodes 36 and 40 of the And gates 32*a* and 33*a* transmits the output of the And gate 32*a* to a low pass filter 65 and during the other nine cycles of each such train transmits the output of the voltage level converter 63 to the low pass filter so that the input to the low pass filter is continuous. The output of the low pass filter 65 is transmitted through a rectifier 66 to an intermediate mixer 67. Each of the other odd numbered channels 3, 5 . . . 19, of the transmitter is connected by an individual circuit to the intermediate mixer 67 which is identical to the circuit by which the channel No. 1 is connected to the intermediate mixer 67**.

The input signal of the second input channel 2 of the transmitter, when the And gate **33*a* is open, is transmitted to a mixer 72 which is connected to the common connection of the diode 60*b* and resistance 61*b*. The output of the voltage level converter 73 which converts the amplitude of the output of the trigger 52 to a predetermined range, for example, between −14 and −18 volts, is also transmitted to the mixer 72 whose operation is controlled by the ring switch 44 whose output conductor B is connected to the mixer. The output of the And gate 33*a* is transmitted by the mixer 72 to the inverter 74 during the cycle of each train of ten cycles of the basic frequency during which −6 volts is applied by the output conductor A of the ring switch to the diodes 36 and 40 of the And gates 32*a* and 33*a* and the output of the voltage level converter 73 is transmitted by the mixer 72 to the converter 74 during the other nine cycles of each such train. The output of the inverter 74 is transmitted through a low pass filter 75 and a rectifier 76 to an intermediate mixer 77. The signals of the other even numbered channels 4, 6 . . . 20, of the transmitter are similarly transmitted to the intermediate mixer 77 by circuits identical to the circuit described above in connection with channel 2**. Each low pass filter is thus continuously energized by a consecutive train of ten cycles, one half cycle of which is modulated by the signal of an input channel so that any ringing of the filter caused by such modulation of a half cycle in any filter decays during the nine and a half cycles before the next modulated half cycle is transmitted to the low pass filter.

In order to provide for proper synchronization and mixing of the outputs of the intermediate mixers 67 and 77 in the final mixer 90 of the transmitter, the operation of the intermediate mixer 67 which transmits the modulated half cycles from the rectifiers of the odd number channels to the final mixer 90 is controlled by the sequence switches **91*a*–91*g* respectively, whose operation in turn is controlled by the ring switch 44 to whose output terminals A–K the sequence switches 92A–K are connected through the inverters 92*a–k*,** respectively.

The sequence switches **91*a–k* are also connected to the inverter 74 through a trigger 94**.

The operation of the mixer 77 is controlled by similar sequence switches **96*a–k* which are connected to the trigger 94 by the inverter 97. The operation of the sequence switches 96 in turn is controlled by the ring switch 44 to whose output conductors A–K the sequence switches 96*a–k*, respectively, are each connected by means of a delay switch 98 and a monostable multivibrator 99. The sequence switches cause the outputs of the intermediate mixers 67 and 77 to be transmitted to the final mixer 90** in proper sequence and synchronization so that the output of the final mixer is of sine wave form with consecutive half cycles of each train of ten cycles of the carrier frequency modulated by the signal inputs of consecutive channels of the transmitter.

It will now be apparent that the transmitter 30 includes a plurality of channels, a commutator controlled by a ring switch 44 for consecutively connecting its channels to individual circuits associated with each channel to produce consecutive trains of ten cycles each of an output or carrier wave, consecutive half cycles of each train being modulated by the input signals of consecutive transmitter channels.

It will further be seen that the individual circuit of each channel has means for producing a continuous frequency output having predetermined half cycles thereof modulated by the signal input of the channel and that the continuous frequency outputs of the individual channels are transmitted to mixers where the modulated half cycles of each individual channel frequency output are picked off in sequence and combined into a carrier frequency or wave composed only of the modulated half cycles of the channel frequency outputs.

The amplitude of the half cycles of the carrier wave provided by the frequency output of one of the transmitter channels, for example channel 1, is smaller than the amplitude of the half cycles of the carrier wave provided by the frequency outputs of the other transmitter channels so that consecutive trains of ten cycles each of the carrier wave are thus provided with a synchronizing signal by means of which a synchronizing circuit of the receiver 100 causes the signals from the tarnsmitter channels 1–20 to be transmitted to the receiver output channels 101–120, respectively, to which the output of the transmitter is transmitted by means of the cable 121. The input from the cable 121 is transmitted through the impedance matching network 123 and amplifier 124 to a negative signal rectifier 125 and a positive signal rectifier 126. The positive signal rectifier rectifies the positive half cycles of the carrier wave carrying the data or signals from the odd number channels of the transmitter to a commutator or matrix 130 while the negative signal rectifies the negative half cycles of the carrier wave carrying the information or signals of the even number channels and transmits the negative half cycles of the carrier wave through an inverter 131 to the commutator 130. The commutator 130 transmits half cycles carrying the signals from the twenty transmitter channels to the twenty output channels of the receiver, each receiver output circuit including a clipper 132, an amplifier 133 and a low pass filter 134. The commutator consecutively transmits consecutive half cycles from the negative and positive signal rectifiers to the output circuits and its operation is controlled by a ring switch 140. The operation of the ring switch and commutator is controlled by a circuit which includes a phase control circuit 141 which transmits the output of the amplifier 124 to an amplitude descriminator 142, a trigger 143 which produces a pulse for each cycle of the carrier frequency, except for the cycle having the small amplitude which is modulated with the signal of the transmitter channel 1, and a ring stepper 144. The control circuit of the ring switch and the commutator also includes a trigger 147, an inverter 148, a synchronizing circuit 139 and a reset circuit 150 for the ring switch.

Figure 3:
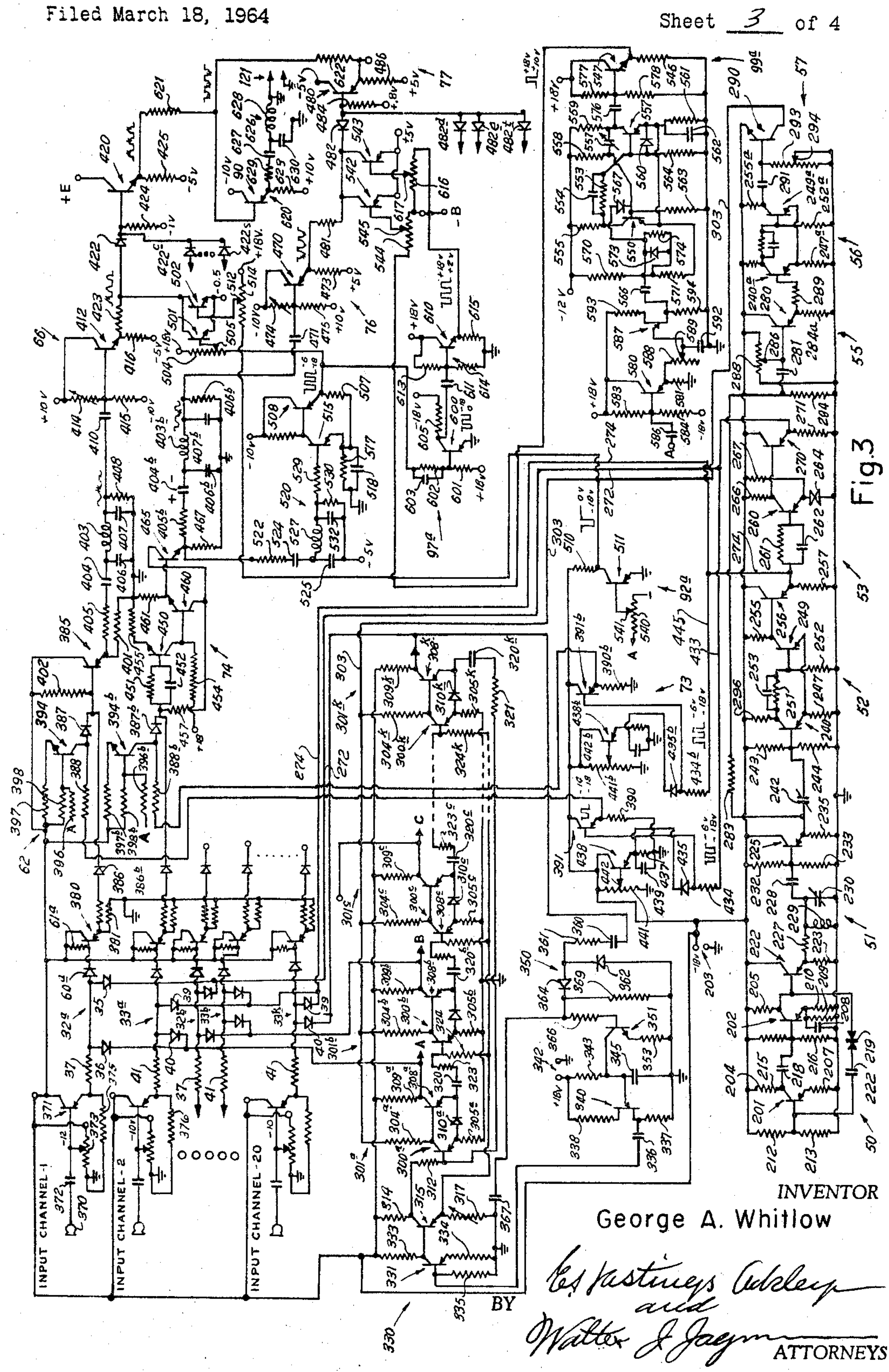
FIGURE 3 is a schematic diagram of the circuit of the transmitter.

Referring now particularly to FIGURE 3 of the drawings, the basic frequency generator 50 may be an oscillator having a pair of transistors 201 and 202 whose collectors are connected to the negative side of an input circuit 203 through the resistors 204 and 205, respectively. The emitter of the transistor 201 is connected to the other side of the source of negative voltage through resistance 207 and ground while the emitter of the transistor 202 is connected to the other side of the input circuit through the capacitor 208 and the resistances 209 and 210 which are connected in parallel. The base of the transistor 201 is provided with a biasing potential being connected to the common connection of the voltage divider resistances 212 and 213 connected in series across the input circuit. The base of the transistor 202 similarly is provided with a biasing potential being connected to the common connecton of the voltage divider resistances 215 and 216 connected in series across the input circuit. The output of the transistor 201 is applied across the base emitter circuit of the second transistor 202 since the common connection of the resistance 204 and the emitter of the first transistor 201 is connected to the base of the transistor 202 through the capacitor 218. A feedback circuit which includes a crystal 219 and a blocking capacitor 220 is connected between the base of the first transistor 201 and the common connection of the resistance 205 and the collector of the transistor 202. The crystal maintains the frequency of the output of the oscillator or generator 50 at a predetermined value, for example, eighty (80) kilocycles per second. The oscillator includes an amplifying transistor 222 whose base is connected to the common connection of the resistance 205 and the collector of the transistor 202. The collector emitter circuit of the amplifying transistor is connected across the input circuit 203 through a resistance 223 connected between the emitter and ground.

The filter or sine formation circuit 51 to which the output of the generator 50 is transmitted includes a transistor 225 across whose base emitter circuit the output of the generator is applied, the base of the transistor 225 being connected to the common connection of the resistance 223 and the emitter of the transistor 222 through the serially connected resistance 227 and capacitor 228. An inductance 229 and a variable capacitance 230 are connected in parallel between ground and the common connection of the resistance 227 and the capacitor 228. The base of the transistor 225 is also connected to the common connection of the voltage divider resistances 232 and 233 connected in series across the input circuit 203 while its emitter collector circuit is connected across the input circuit through the resistance 235 which is connected between the emitter of the transistor 225 and ground. The inductance 229 and the capacitor 230 function in a well known manner to cause the square wave output of the generator to be transformed to a sine wave form and thus cause the output of the transistor 225 to be of sine wave form.

The trigger 52 which coverts the sine wave output of the sine formation circuit into a square wave form of predetermined voltage level and amplitude includes a first transistor 240 to whose base emitter circuit the output of the transistor 225 is applied, its base being connected to the common connection of the resistance 235 and the emitter of the transistor 225 through the variable capacitor 242 provided for controlling the pulse symmetry of the output of the trigger. The base is also connected to the common connection of the voltage divider resistances 243 and 244 connected in series across the input source 203. The collector of the transistor 240 is connected to one side of the input circuit 203 through the resistance 246 while its emitter is connected to the other side through the resistance 247 and ground. The output of the transistor 240 is applied across the base emitter circuit of a second transistor 249 whose base is connected to the common connection of the resistances 251 and 252 connected in series between ground and the common connection of the resistance 246 and the collector of the transistor 240, and whose emitter is connected to the common connection of the resistance 247 and the emitter of the transistor 240. A capacitor 253 is connected across the resistance 251. The collector of the transistor 249 is connected to the negative side of the input circuit 203 through the resistance 255. The output of the transistor 249 is applied across the base emitter circuit of an amplifying transistor 256 whose base is connected to the common connection of the resistance 255 and the collector of the transistor 249. The emitter of the amplifying transistor is connected to ground through the resistance 257, and thus to one side of the input circuit while its collector is connected to the negative side of the input circuit.

The inverter 53 for inverting the output of the trigger 52 includes a transistor 260 whose base is connected to the common connection of the resistance 257 and the emitter of the amplifying transistor 256 through a resistance 261 and a capacitor 262 connected in parallel to one another and its emitter is connected to ground through the Zener diode 264. The collector of the first transistor 260 is connected to the negative side of the input circuit 203 through the resistance 266 while the common connection of the Zener diode 264 and the emitter thereof is connected to the negative side of the input circuit through the resistance 267. The output of the transistor 266 is applied across the base emitter circuit of the second or amplifying transistor 270 whose base is connected to the common connection of the resistance 266 and the collector of the transistor 260. The emitter of the amplifying transistor is connected to ground through a resistance 271 while its collector is connected to the negative side of the input circuit.

The output of the second transistor 270 of the inverter 53 is applied to the diodes 35 of the and gates 32 of the commutator 31 through the conductor 272 which is connected the common connection of the resistance 271 and the emitter of the amplifying transistor 270. The output of the trigger 52 is applied to the diodes 39 of the And gates 33 by means of the conductor 274 which is connected to the common connection of the resistance 257 and the emitter of the third or amplifying transistor 256 of the trigger 52.

The phase adjusting circuit 55 includes a transistor 280 across whose base emitter circuit the output of the sine formation circuit 51 is applied, its base being connected through a capacitor 281 to the common connection of a pair of resistances 283 and 284 connected in series across the emitter resistance 235 of the transistor 255 and its emitter being connected to ground through the resistance **284*a*. The collector of the transistor 280 is connected to the negative side of the input circuit 203. The phase of the output of the transistor is adjustable by means of the variable contact 286 connected to the common connection of the capacitor 281 and the base of the transistor 280, of the resistance 288 connected across the input circuit 203**.

The trigger 56 to which the output of the phase control circuit 55 is transmitted is identical to the circuit of the trigger 52 and, accordingly, elements of the trigger 56 have been provided with the same reference characters, to which the subscript "*a*" has been added, as the corresponding elements of the trigger 52. The output of the phase adjusting circuit is applied across the base emitter circuit of the first transistor **240*a* of the trigger 56 its base being connected to the common connection of the resistance 284 and the emitter of the transistor 280 through the resistance 289. The output of the transistor 249*a* of the trigger 56 is transmitted to the transistor 290 of the ring advance circuit 57, the base of the transistor 290 being connected by the capacitor 291 to the common connection of the resistance 255*a* and the collector of the transistor 249*a*. The common connection of the base of the transistor 290 and the capacitor 291 is connected to the ground through a resistance 293 and an adjustable contact 294. The emitter collector circuit of the transistor 290 is connected across the input circuit 203 through the collector emitter circuits of the first transistors 300*a–k* of the ten flip-flop circuits 301*a–k* which constitute the ring switch 44 so that the normally conducting transistor 290 connects the collector emitter circuits of the transistors 300*a–k* across the input circuit 203 except at the end of each cycle of the output of the generator 50 at which time the charge of the capacitor 291 causes the transistor 290** to cut off or be nonconductive for a very short period of time.

The flip-flop circuits **301*a–k* are identical and accordingly, corresponding elements of the flip-flop circuits 301*a–k*** have been provided with the same reference numerals, to which the subscripts "*a–k*" respectively, have been added. The emitter of the transistor 290 of the ring advance circuit is connected to the negative side of the input circuit 203 while its collector is connected to the other side of the input circuit through the conductor 303 and the emitter and collector circuits of the first transistors 300 of the flip-flop circuits 301, whose collectors are connected to the conductor 303 by the resistances 304 and whose emitters are connected to ground through the resistances 305. The second transistor 308 of each flip-flop circuit has its collector connected to the negative side of the input circuit 203 by a resistance 309 and its emitter to the other side of the input circuit through the diode 310 and the resistance 305. The diode 310 is provided to prevent improper functioning of the second transistor in the event the first transistor becomes defective, i.e., leaks. The base of the first transistor **300*a* of the first flip-flop circuit 301*a* is connected through the resistance 312 to the common connection of the resistance 314 and the collector of a transistor 315 of the reset ring switch circuit 316 whose emitter is connected to ground through the adjustable resistance 317. The transistor 315 during normal operation of the transmitter is conductive and causes a biasing potential to be applied to the base of the first transistor 300*a* of the first flip-flop circuit 301*a* which causes it to be conductive any time that the transistor 290 of the ring advance circuit connects its emitter collector circuit across the input circuit except during the cyle of the basic frequency output of the generator 50 following the cycle in which the second transistor 308*k* of the last flip-flop circuit was conductive and charged its capacitor 320*k* which is connected in series with the resistance 321 between the base of the transistor 300*a* and the common connection of the diode 310*k* and the emitter of the transistor 308*k***.

The common connections of the diode 310 and the emitter of the second transistor of each of the flip-flop circuits **301*a–j* is connected to ground through the capacitor 320, the serially connected resistances 323 and 324, and the resistance 317 to apply to the bases of these transistors a potential which renders them conductive during each cycle of the basic frequency output of the generator 50 during which the transistor 290 connects their emitter connector circuits across the input circuit 203 except during the cycle immediately following the cycle during which the second transistor of the immediately preceding flip-flop circuit was conductive and caused its associated capacitor 320 to be charged. The output conductors A–K of the ring switch are connected to the common connections of the resistances 309*a–k* and the collectors of the second transistors 308*a–k* of the ten flip-flop circuits 301*a–k***, respectively, so that the voltage of each of the output conductors A–K of the ring switch is −18 volts when the second transistor of the flip-flop circuit to which it is connected is non-conductive and −6 volts when such second transistor is conductive.

Assuming now that the transistor 315 is conductive, as is normally the case, and the second transistor **308*k* of the last flip-flop circuit 301*k* has been conductive during a cycle of the basic frequency output of the generator 50 and its first transistor 301*k* has been non-conductive, the transistor 290 of the ring advance circuit 57 at the very end of such cycle is rendered non-conductive for a very short period of time which causes the first transistors of the flip-flop circuits to be rendered non-conductive. As the transistor 290 is again rendered conductive at the beginning of the next cycle of the basic frequency output and reconnects the emitter collector circuits of all of the first transistors of the ten flip-flop circuits across the input circuit, the first transistors of the flip-flop circuits 301*b–k* are rendered conductive and thus prevent their second transistors from being conductive. The first transistor of 300*a* of the first flip-flop circuits 301*a*, however, is held non-conductive due to the discharge of the capacitor 320*k* and as a result its second transistor 308*a* is rendered conductive and during such full cycle of the basic frequency charges its capacitor 320*a* so that when the transistor 290 is again momentarily rendered non-conductive, at the end of the cycle during which the transistor 308*a* is conductive, to disconnect the emitter collector circuits of all of the first transistors of the ten flip-flop circuits from the input circuit and then reconnects them across the input circuit, the first transistors 300 of all of the flip-flop circuits are rendered conductive except the first transistor of the flip-flop circuit 301*b* which is now held non-conductive due to the discharge of the capacitor 320*a***.

The ten flip-flop circuits thus sequentially and consecutively cause a voltage of −6 volts to be applied consecutively to the diodes 36 and 40 of the and gates 32 and 33 to which the output conductors are connected during one cycle of each ten cycle train of output of the generator 50 and cause a voltage of −18 volts to be applied thereto during the other nine cycles of each such train.

In order to initiate operation of the ring switch 44 at the time of the transmitter is first placed in operation, the transistor 315 must be rendered non-conductive to cause the first transistor **300*a* of the first flip-flop circuit to be rendered non-conductive. The self start circuit 330 for causing the transistor 315 to be rendered nonconductive includes a transistor 331 whose emitter collector circuit is connected across the input circuit 203 through the resistance 333 which connects its collector to the negative side of the input circuit and a resistance 334 which connects its emitter to the other side of the input circuit. The base of the transistor 315 is connected to the common connection of the resistance 333 and the collector of the transistor 331. The base of the transistor 331 is connected to ground through the resistance 335 and also through the serially connected capacitor 336 and resistance 337. The resistance 337 and a resistance 338 are connected in series with one side of a unijunction transistor 340** across an input circuit 342 of positive voltage. The other side of the unijunction transistor is connected to the common connection of the resistance 343 and capacitor 345 which are connected in series across the input circuit 342.

When the positive voltage is applied across the input circuit by any suitable switch means, not shown, at the instant the operation of the transmitter is initiated, the unijunction transistor 340 is rendered conductive and causes a potential to be applied across the base emitter circuit of the transistor 331 which causes it to be rendered conductive which in turn causes the transistor 315 to be rendered nonconductive and in turn causes the first transistor 300*a* of the first flip-flop circuit to be rendered nonconductive and thus initiate operation of the ring switch.

In order that the unijunction transistor be conductive, only at the initiation of operation of the transmitter, a cutoff circuit 350 for the unijunction transistor is provided to render it nonconductive when the ring switch 44 has been placed in operation. The cutoff circuit includes a transistor 351 whose emitter collector circuit is connected across the input circuit 342 by means of the resistance 343 which is connected to its collector and the resistance 353 which is connected to its emitter. A capacitor 360 is connected to the common connection of the resistance 309*k* and the emitter of the last flip-flop circuit 301*k* of the ring switch. The capacitor 360 is connected to ground through the resistance 361 and the diode 362 and also through the resistance 361, the diode 364 and the resistance 365. A resistance 366 is connected between the base of the transistor 351 and the common connection of the resistance 365, the diode 364 and a capacitor 367 whose other side is connected to ground.

When the ring switch 44 is not in operation, the second transistor 308*k* of the last flip-flop circuit is not periodically rendered conductive, no pulses are transmitted through the capacitor 360 and resistance 361 to the two voltage doubler diodes 362 and 364 and, therefore, the capacitor 367 is not charged and no positive bias voltage is applied across the base emitter circuit of the transistor 351 through the current limiting resistance 366. The transistor 351 is therefore non-conductive. During the time that the transistor 351 is non-conductive, the capacitor 345 is charged positively through the resistance 343 and this causes the unijunction transistor 340 to be rendered conductive. The time constant of the unijunction biasing circuit which includes the resistance 343 and the capacitor 345 is quite short so that the unijunction transistor is rendered conductive within a few cycles, for example, ten or twenty of the basic frequency of the oscillator after positive voltage is applied across the input circuit 342 by any suitable switch means, not shown, at the instant of the initiation of the operation of the transmitter. When the unijunction transistor is rendered conductive a potential is applied across the base emitter circuit of the transistor 331 which causes it to be rendered conductive, which in turn causes the transistor 315 to be rendered non-conductive, which in turn causes the first transistor 300*a* of the first flip-flop circuit to be rendered nonconductive and thus initiate operation of the ring switch. Succeeding pulses from the basic carrier generator 50 applied to the ring advance switch through the trigger 56 and the ring advance circuit 57 then cause the flip-flop circuits of the ring switch to be operated successively. After the ring switch is in operation, periodic voltage pulses are transmitted through the capacitor 360 to the voltage doubler which includes the diodes 362 and 364 as the transistor 308*k* is periodically rendered conductive. This causes the capacitor 367 to become charged and a positive bias voltage to be applied across the base emitter circuit of the transistor 351 rendering it conductive. When the transistor 351 is rendered conductive, since it is connected in series with the resistance 353 across the capacitor 345, the transistor 351 shorts the capacitor 345 thus discharging the capacitor 345 and this in turn renders the unijunction transistor 340 non-conductive within a very short period of time after the ring switch is in proper operation.

It will now be seen that the ring switch 44 is automatically set in operation whenever voltages are applied across the input circuits 203 and 342 of the transmitter at the time the transmitter is placed in operation to cause automatic initiation of operation of the ring switch due to the provision of the self start circuit 330 and that the self start circuit is rendered inoperative once the ring switch is placed in operation by the cutoff circuit 350.

Each of the input channels 1–20 of the transmitter includes a suitable transducer 370, such as a microphone, whose output is applied across the base emitter circuit of an amplifier transistor 371 through a capacitor 372, the base of the amplifying transistor being connected to the transistor, to the common connection of a capacitor 372 and an adjustable resistance 373. The resistance 373 is connected across the input circuit 203 so that the direct current voltage level of the output of the transistor 371 may be adjusted by adjusting the value of the adjustable resistance 373. The resistance 37 of each odd number input channel is connected to the common connection of the emitter of its transistor 371 and a resistance 375 which is connected to ground. The resistance 41 of each of the even number input channels are similarly connected to the common connection of the emitter of its transistor 371 and a resistance 376 which is connected to ground.

The output of the and gate 32*a* of channel 1 is transmitted to an amplifying transistor 380 whose base is connected to the common connection of the diode 60*a* and the resistance 61*a*. The emitter collector circuit of the transistor is connected across the input circuit 203 through a resistance 381 which connects the emitter of the transistor 380 to ground.

The output of the amplifying transistor 380 of channel 1 is transmitted to the base of a transistor 385 through a diode 386 of the mixer 62. The mixer 62 includes a diode 387 which is connected in series with a resistance 388 between the base of the transistor 385 and the common connection of the resistance 390 and the emitter of the output transistor 391 of the voltage level converter 63. A transistor 394 of the mixer 62 has its collector connected to the common connection of the diode 387 and the resistance 388 for shunting the output of the voltage level converter 63 during the cycle of each train of ten cycles during which the output conductor A of the ring switch is at −6 volts, the base of the transistor 394 being connected through the resistance 396 to the output conductor A. The emitter and base of the transistor 394 are connected to the negative side of the input circuit 203 through the resistances 397 and 398, respectively. The transistor 394 is rendered fully conductive each time the output conductor A of the ring switch 44 is at −6 volts and thus shunts the output of the transistor 391 of the voltage level converter 63. The emitter collector circuit of the transistor 385 is connected across the input circuit 203 by means of the resistance 401 which connects its emitter to ground. A resistance 402 is connected between the base of the transistor 385 and the negative side of the input circuit 203 between the common connection of the diodes 386 and 387 and the base of the transistor 385 to provide a biasing potential therefor. The output of the transistor 385 is applied across the low pass filter 65 which includes inductance 403 and a capacitor 404 connected in series to the common connection of the resistance 401 and the emitter of the transistor 385 through a resistance 405, a capacitor 406 connected between the ground and the common connection of the inductance 403 and the capacitor 405, and a capacitor 407 and a resistance 408 connected in parallel between ground and the common connection of the inductance 403 and the blocking capacitor 410 through which the output of the low pass filter is applied to the base of the transistor 412 of the rectifier 66. The base of the rectifier transistor 412 is also connected to the common connection of a pair of serially connected resistances 414 and 415 whose other ends are connected to suitable sources of negative and positive voltage. The resistance 414 is adjustable to vary the amplitude of the output of the transistor 412. The transistor 412 has its collector connected to a source of positive voltage while its emitter is connected by a resistance 416 to a source of negative voltage.

The output of the rectifier transistor 412 is transmitted to the intermediate mixer 67 which includes a transistor 420 by means of the serially connected diode 422 and resistance 423, the resistance 423 being connected to the common connection of the resistance 416 and the emitter of the rectifier transistor and the diode being connected to the base of the intermediate mixer transistor 420. Biasing voltage is applied to the base of the rectifier of the transistor 420 from a suitable source of negative voltage through a resistance 424.

Each of the other odd number channels 3, 5 . . . 19, has a circuit connecting its and gate 32*c*, *d* . . . *s* to the intermediate mixer 67 which is identical to the above described circuit of channel 1, each having a mixer, a low pass filter and a rectifier, and accordingly, while only such circuit of channel 1 has been illustrated completely, the illustrated elements of each of such circuits of the other odd number channels, 3, 5 . . . 19, have been provided with the same reference numerals to which the subscripts *c*, *d* . . . *s*, have been added, as the corresponding elements of such circuit of channel 1. The mixer of channel 3 is connected to the output connector B of the ring switch 44, the mixer of channel 5 is connected to the output conductor C of the ring switch, and so on, so that the mixer of each odd number channel transmits the output of the voltage level converter 63 during nine cycles of each ten cycle train of the basic frequency and the output of the and gate to which it is connected during the one cycle of the train during which the output conductor of the ring switch to which it is connected is at −6 volts.

The voltage level converter 63 whose output is transmitted to each of the mixers of the odd numbered channels 1, 3, 5 . . . 19, includes the transistor 391 whose emitter collector circuit is connected across the input circuit 203 through the resistance 390 which connects its emitter to ground. The output of the inverter 53 is applied to the base of the transistor 391 by means of the conductors 272 and 433 and the resistance 434. The resistance 434 is also connected through a diode 435 to the common connection of a resistance 437 and the emitter of a transistor 438 whose emitter collector circuit is connected across the input circuit 203 through the resistance 437 and a capacitor 439 which are connected in parallel across the resistance 437. The base of the transistor 438 is connected to a voltage divider resistance 441 connected across the input circuit 203 by means of the adjustable contact 442. The base of the transistor 391 being connected to the common connection of the diode 435 and the resistance 434, the output of the transistor 438 controls the degree of conductivity of the transistor 391 during each half cycle during which it is not completely conductive, the output of the transistor 391 being −18 volts during each half cycle in which it is fully conductive. The voltage and amplitude of the converter 63 is thus determined by the setting of the contact 442 on the voltage divider resistance 441.

The output of the input channel 2 when its and gate 33*a* is open is transmitted to the mixer 72 which is identical to the mixer 62 and, accordingly, the elements of the mixer 72 have been provided with the same reference numerals to which the subscript *b* has been added as the corresponding elements of the mixer 62. The resistance 396*b* is connected to the output terminal A of the ring switch 44 while its resistance 388*b* is connected to the output of the voltage level converter 73 which is identical to the voltage level converter 63 and whose elements have been provided with the same reference numerals, to which the subscript "*b*" has been added, as the corresponding elements of the converter 63. The base of the transistor 391*b* is connected to the output or common connection of the trigger 52 through the conductors 274 and 445 and the resistance 434*b* and to the output of the transistor 438*b* through the diode 435*b*.

The inverter 74 to which the output of the mixer 72 is transmitted includes a first transistor 450 whose base is connected to the common connection of the diodes 386*b* and 387*b* through a resistance 451 and capacitance 452 and whose emitter collector circuit is connected across a suitable source of positive voltage through a resistance 454 which connects its collector to the positive side of the source and a resistance 455 which connects its emitter through ground to the other side of the source. The common connection of the diodes 386*b* and 387*b* is connected to the positive side of the source through a baising resistance 457.

The output of the first transistor 450 is applied to the base of the second transistor 460 whose base is connected to the common connection of the resistance 455 and the collector of the transistor 450 and whose emitter collector circuit is connected across a source of positive voltage, its collector being connected to the positive side of the source and its emitter being connected to the other side of the source through the resistance 461 and ground. The output of the second transistor is applied to a third transistor 465 whose base is connected to the common connection of the resistance 461 and the emitter of the second transistor 460 and whose emitter collector circuit is connected again across the source of positive voltage, its collector being connected to the positive side of the source and its emitter being connected to the other side thereof through the resistance 467 and ground.

The low pass filter 75 is identical to the low pass filter 65 and accordingly elements of the filter 75 have been provided with the same reference characters to which the subscript "*b*" has been added as corresponding elements of the filter 65.

The output of the low pass filter 75 is transmitted to the base of the transistor 470 of the amplifier 76 through a blocking capacitor 471. The emitter of the transistor 470 is connected to the positive side of a source or input circuit of positive voltage through a resistance 473 while its collector is connected to a negative source of voltage. The base of the transistor is also connected to the common connection of a pair of resistances 474 and 475 whose opposite ends are connected to negative and positive sources of voltage, respectively. The output of the rectifier transistor 470 is transmitted to the base of the transistor 480 of the intermediate mixer 77, the common connection of the resistance 473 and the emitter of the transistor 470 being connected to the base of the transistor 480 through a resistance 481 and a diode 482. The base of the transistor 480 is provided with a biasing potential through a resistance 484 connected to a suitable source of positive potential. The emitter of the transistor 480 is connected to a source of positive potential through a resistance 486 and its collector is connected to a source of negative voltage. Each of the other even numbered channels 4, 6 . . . 20 are provided with a circuit between its and gate 33*d*, *f* . . . *t* and the intermediate mixer 77 which is identical to the above described circuit of channel 2 and accordingly, while only such circuit for the channel 2 has been illustrated and described completely, illustrated elements of each of the other even numbered channels 4, 6 . . . 20 have been provided with the same reference numerals to which the subscripts "*d*, *f* . . . *t*" have been added as the corresponding elements of the circuit of channel 2.

The modulated half cycles of the outputs of the rectifiers 66 of the odd number channels 3 . . . 19 are impressed or applied to the base of the transistor 420 of the intermediate mixer 67 through the diodes 422*c* . . . 422*s* under the control of the sequence switches 91*a-k*, respectively, so that the output of the intermediate mixer during each train of ten cycles of the basic frequency is a train of ten modulated half cycles, corresponding to the first half cycle of each cycle of the train. Each of the sequence switches 91*a-k* includes a pair of transistors 501 and 502 and the output of the delayed pulse train generator 94 is applied to the base of the transistor 501 of each of the sequence switches 91*a-k* through an adjustable resistance 504 which is connectable to the base of the transistor 501 through the adjustable contact 505 thereof. One side of the resistance 504 is connected to the positive side of a source or input circuit of positive voltage and the other side is connected to the common connection of a resistance 507 and the emitter of the output transistor 508 of the delayed pulse generator 94. The emitters of the sequence switch transistors 501 and 502 are connected to a suitable source of negative voltage while their collectors are connected to the common connection of the diode 422 and the resistance 423. The base of the transistor 502 is connected to the common connection of a resistance 510 and the collector of the transistor 511 of the inverter 92*a* by means of the adjustable contact 512 of the adjustable resistance 514. One side of the resistance 514 is connected to a source of positive voltage and its other side is connected to the common connection of the resistance 510 and the collector of the transistor 511.

The output of the inverter causes the transistor 501 to be conductive during the second half of each cycle of each train of ten cycles so that it permits only the second half of each cycle of the output of the rectifier 66, which of course is of a base D.C. level, to be transmitted to the intermediate mixer. The transistor 502 is rendered conductive only during the full cycle during which the output conductor A of the ring switch 44 is at −6 volts, i.e., the full first cycle of each train of ten cycles of the base frequency, and this causes the modulated first half cycle to be transmitted to the intermediate mixer 67.

The emitter collector circuit of the output transistor 508 of the delayed pulse train generator 94 is connected across the source of negative voltage by means of the resistances 507 and 517 which are connected in series to connect the emitter of the transistor 508 to ground, its collector being connected to the negative side of the source of input voltage. The transistor 515 of the pulse generator 94 is connected across the input circuit of negative voltage through the resistances 516 and 517 which connect its collector to the negative side of the source of input voltage and its emitter to ground, respectively. The capacitor 518 is connected across the resistance 517. The output of the transistor 465 of the inverter 74 is applied to the base of the transistor 515 through a delay network 520 which causes a lag of ninety degrees between the output of the inverter and the output of the delayed train pulse generator so that the output of the low pass rectifier and of the pulse generator are in phase. The time delay circuit is connected to the common connection of the resistance 467 and the emitter of the transistor 465 through by means of a resistance 522 which is connected in series with a pair of capacitors 524 and 525 between the common connection of the resistance 467 and the emitter of the transistor 465 and a negative source of voltage. The time delay circuit includes an inductance 527 one of whose ends is connected to the common connection of the capacitors 524 and 525 and whose other end is connected to the base through the resistance 529. A resistance 530 and a capacitor 532 are connected in parallel between the common connection of the inductance 527 and the resistance 529 and a source of negative voltage.

The base of the transistor 511 of the inverter 92*a* is connected to the output conductor A of the ring switch 44 by means of the resistance 540, one end of which is connected to the output conductor A and whose other end is connected to a suitable source of positive voltage, and the adjustable contact 541.

The sequence switches 91*b–k* and the inverters 92*b–k* of the other odd number channels 3 . . . 19 are identical in circuitry to the sequence switch 91*a* and the inverter 92*a*, respectively, and, therefore, have not been shown in detail. The inverters 92*b–k* are connected to the output conductors B–K, respectively, of the ring switch 44 and the outputs of the rectifiers 66 of the ten odd numbered channels 1–19 are consecutively and sequentially applied to the base of the transistor 420 of the intermediate mixer 67 so that the output of the intermediate mixer 67 is a train of negative modulated half cycles corresponding to the ten input signals of the ten odd numbered channels 1, 3 . . . 19. Since the transistors 502 of the sequence switches have a potential applied thereto throughout a full cycle of the basic frequency of the generator 50, each such sequence switch is closed or conductive during the cycle containing the modulated half cycle of its associated rectifier 66 even though such output of its rectifier 66 due to the lag produced in the low pass filter 65 thereof causes a ninety degree (90°) lag in the output of the rectifier 66 relative to the basic frequency of the transmitter.

The sequence switches 96*a* of the even number channels are identical to the circuit switches 91 of the odd number channels and similarly control the operation of the intermediate mixer 77. For example, the sequence switch 96*a* includes a pair of transistors 542 and 543 whose collectors are connected to the common connection of the resistance 481 and diode 482 of the circuit of channel 2 while their emitters are connected to a suitable source of positive voltage. The output of the mono-stable multivibrator 99*a* is applied to the base of the transistor 542 through a resistance 544 and the adjustable contact 545, the resistance 544 being connected between a source of negative voltage and the common connection of the resistance 546 and the emitter of the output transistor 547 of the multivibrator 99*a*. The multivibrator may be of any suitable well known type. For example, it may include a pair of transistors 550 and 551, the output of the first transistor 550 being applied to the base of the second transistor 551 by means of the resistance 553 and capacitance 554 connected in parallel between the base of the second transistor 551 and the common connection of the collector of the first transistor and the resistance 555 which connects the collector to a negative source of voltage. The output of the second transistor is applied to the base of the first transistor, the base of the first transistor being connected to the common connection of the variable capacitor 557 and the resistance 558 connected in series between the common connection of the resistance 559 and the collector of the second transistor 551. The resistance 559 connects the collector of the second transistor to a source of negative voltage and the resistance 558 connects the common connection of the capacitor 557 and the base of the first transistor to the source of negative voltage. A diode 560 is connected between the common connection of the resistance 554 and the base of the second transistor and the common connection of the emitter of the second transistor and a resistance 561 and a capacitor 562 which are connected in parallel to ground. The emitter of the first transistor is connected to ground through the resistance 561 and capacitor 562 while the bases of the transistors 550 and 551 are connected to ground through the resistances 563 and 564, respectively.

The output of the delay switch 98*a* is applied to the base of the first transistor 550 of the multivibrator through a blocking capacitor 566 and a diode 567. The common connection of the blocking capacitor and the diode is connected to the common connection of the resistances 570 and 571, which are connected in series with the resistance 561 across the source of negative voltage, by a diode 573 and a resistance 574 connected in parallel.

The output of the second transistor 551 of the multivibrator is transmitted to the base of its output transistor 547 by means of the blocking capacitor 576 which connects the base of the output transistor to the common connection of the resistance 559 and the collector of the second transistor 557. The base of the transistor is also connected to the common connection of a pair of resistances 577 and 578 which are connected in series across an input circuit of negative voltage across which the emitter collector circuit of the output transistor is connected by means of the resistance 546.

The time delay switch **98*a* includes a transistor 580 whose emitter collector circuit is connected across an input circuit of positive voltage by means of a resistance 581 which connects its emitter to ground, its collector being connected to the positive side of such input circuit. The base of the transistor 580 is connected to the common connection of the resistances 583 and 584 connected in series to sources of positive and negative voltage, respectively. The base is also connected to the output conductor A of the ring switch 44 through the blocking capacitor 586. The output of the transistor 580 is applied to one side of a uni-junction transistor 587 by means of the variable resistance 588 and its adjustable contact 589, the resistance 588 being connected to the common connection of the resistance 581 and the emitter of the transistor 580. A capacitor 592 is connected between the common connection of the adjustable contact 590 and one side of the uni-junction transistor 592 whose other side is connected across the input circuit of positive voltage by the resistances 593 and 594**.

The various sources of positive and negative voltages of the various sub circuits of the transmitter each have one side thereof connected to ground, or a common ground, as will be apparent to those skilled in the art.

When the output conductor A has a −6 voltage applied thereto at the beginning of a cycle of the basic frequency, the time delay circuit whose lag or period can be adjusted by means of the adjustable contact 589 produces a pip or sharp pulse which triggers the mono-stable multivibrator in the usual well known manner so that the monostable multivibrator produces a full cycle square wave. Each time during one cycle of each train of ten cycles during which the output conductor A of the ring switch 44 has −6 volts applied thereto, the output of the multivibrator renders the transistor 542 of the switch **96*a* conductive during the half cycle of such cycle during which the output of the transistor 470 of the rectifier 76 is modulated by the signal input of the transducer of channel 2**.

The normally non-conductive transistor 543 is rendered conductive by the inverter 97, which inverts the output of the delayed pulse train generator during the half cycle of each cycle of the output of the rectifier which is at the base D.C. voltage level. The inverter 97 includes a transistor 600 whose base is connected to the common connection of the resistance 507 and the emitter of the transistor 508 of the delayed pulse train generator 94 by means of a resistance 602 and to the positive side of a source of positive voltage by a resistance 601. A capacitor 603 is connected across the resistance 602. The emitter collector circuit of the transistor 600 is connected across a source or input circuit of negative voltage by a resistance 605 one side of which is connected to the negative side of the input circuit and the other being connected to the collector of the transistor 600. The emitter of the transistor 600 is connected to ground. The output of the transistor 600 is applied to the base of the transistor 610 by means of the blocking capacitor 611 connected between the base and the common connection of the resistance 605 and the collector of the transistor 600. The base of the transistor 610 is also connected to the common connection of the resistance 613 and the variable resistance 614 connected in series across an input circuit or source of positive voltage across which the emitter collector circuit of the transistor 610 is also connected by means of the resistance 615.

The output of the transistor 610 is applied to the base of the transistor 543 of the signaling switch **96*a* by means of the adjustable resistance 616 whose contact 617 is connected to the base of the transistor, one side of the resistance being connected to a source of negative voltage and its other side being connected to the common connection of the resistance 615 and the emitter of the transistor 610. The output of the inverter 97*a* causes the transistor 543 to be conductive at such times during each cycle of each train of ten cycles of the output of the rectifier 76 which permits only the base DC level voltage of the rectifier output to be transmitted to the intermediate mixer 77. The transistor 542 is rendered conductive only during the portion of the cycle during which the output conductor A of the ring switch 44 is at −6 volts, and this causes the modulated half cycle of the channel 2 to be transmitted to the intermediate mixer 77**.

Each of the other even number channels 4 . . . 20 is provided with a similar circuit, which includes an inverter **98*b* . . . 98*k*, a monostable multivibrator 99*b* . . . 99*k* and sequence switch 96*b* . . . 96*k*, to cause their rectifiers 76 to be applied to the base of the transistor 480 of the mixer 67, it being apparent that the delay switches 98*b–k* are connected to the output connectors B . . . K of the ring switch so that the output of the intermediate mixer 77** is a train of negative half cycles which are modulated by the signal inputs of the even number channels.

The final mixer 90 includes a transistor 620 whose base is connected to the common connection of the resistance 425 and the emitter of the transistor 420 of the intermediate mixer 67 through a resistance 621 and to the common connection of the resistance 486 and the emitter of the transistor 480 of the intermediate mixer 77 through a resistance 622. The emitter of the transistor 620 is connected to the positive side of a source of positive voltage through a resistance 623 and its collector is connected to a negative side of a source of negative voltage. The output of the final mixer is transmitted to the two conductors of the cable 121 through a wave shaping and filter network circuit 626 which includes a capacitor 627 and an inductance 628 connected in series to the common connection of the resistance 623 and the emitter of the transistor 620 by the resistance 629. A capacitor 630 is connected between ground and the common connection of the inductance 626 and the capacitor 627.

It will now be seen that the transmitter 30 includes twenty input channels, a generator 50 for generating a basic predetermined frequency, for example, 80 kilocycles, a switch means which includes the commutator 31 and a ring switch 44 which synchronizes the opening and closing of the And gates of the commutator for consecutively transmitting the outputs of the odd number channels to an intermediate mixer 67 and the outputs of the even number channels to an intermediate mixer 77, and a final mixer 90 in which the outputs of the intermediate mixers are combined to form a carrier wave whose consecutive half cycles are modulated by the input signals of consecutive channels.

It will further be seen that the And gates of the channels are connected to the mixers 67 and 77 through initial mixers 62 or 72, low pass filters 65 or 75 and the rectifiers 66 or 76, the initial mixers 62 and 72 providing a continuous carrier frequency input to the low pass filters with only one half cycle of each train of ten full cycles of such inputs to such low pass filters being modulated by the signal being transmitted by the transducer of its channel whereby the ringing of the filter if allowed to decay between successive modulated half cycles.

It will further be seen that the direct current voltage level of one of the channels, for example, channel 1, is at a lower voltage than such voltage level of the other nineteen channels so that every twentieth half cycle of the carrier wave output of the transmitter is of a lower amplitude than the other nineteen half cycles and provides a synchronizing signal for a receiver to which is transmitted the modulated carrier wave of the transmitter.

Figure 4:
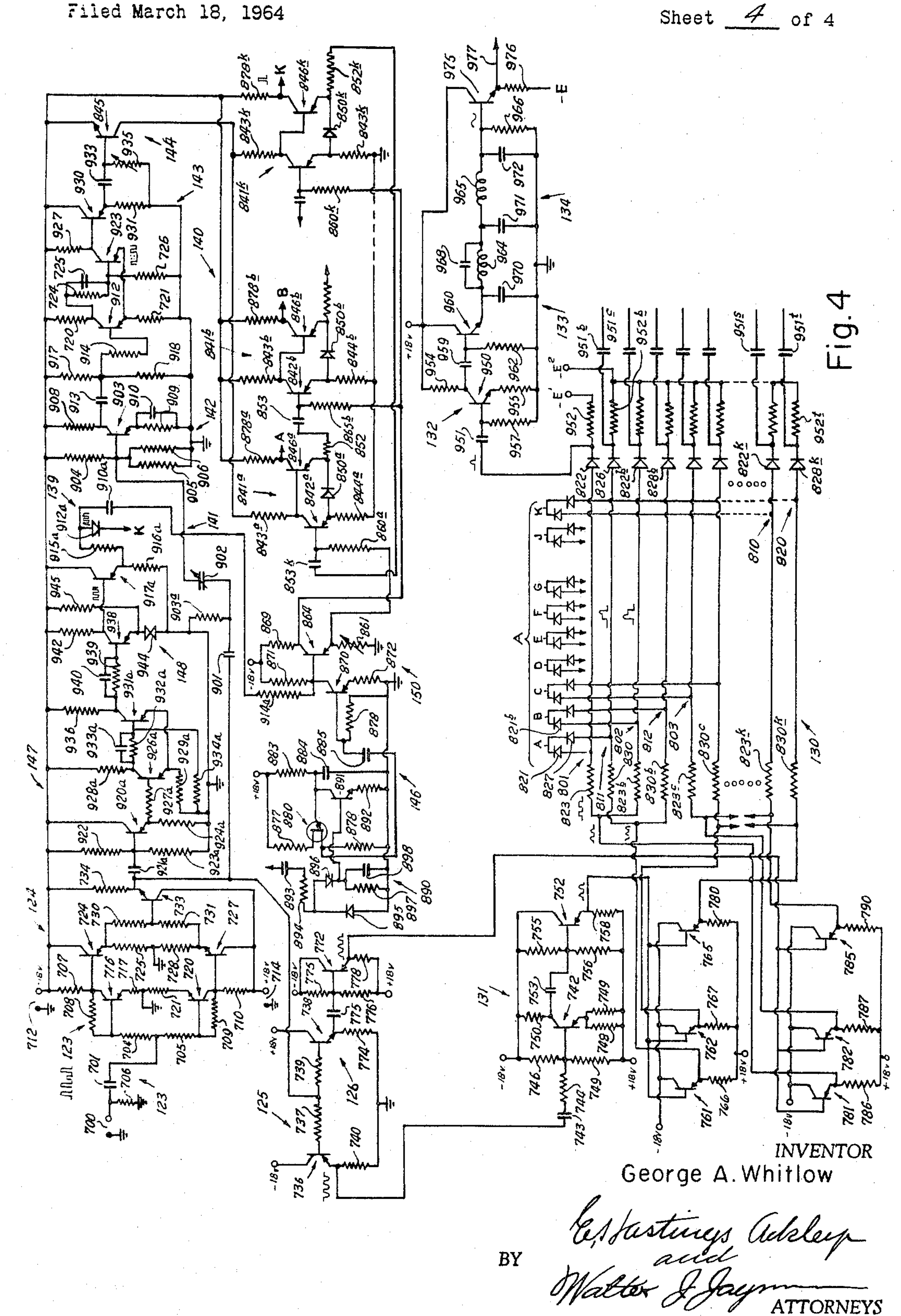
FIGURE 4 is a schematic diagram of the circuit of the receiver.

Referring now particularly to FIGURE 4 of the drawing, the output of the transmitter is transmitted by means of the cable 121 to the input circuit 700 of the receiver 100 connected to the impedance matching network 123 which includes a blocking capacitor 701, one side of which is connected to one side of the input circuit 700 and whose other side is connected to the common connection of the resistances 704 and 705. A resistance 706 is connected across the input circuit.

The resistances 704 and 705 are connected in series with the resistances 707, 708, 709 and 710 between the negative and positive sides of the input circuit 712 of negative voltage and the input circuit 714 of positive voltage. The emitter collector circuit of a transistor 716 is connected across the input circuit 712 by means of the resistance 707 connected to its collector and a resistance 717 which connects its emitter to ground. The base of the transistor 716 is connected to the common connection of the resistances 704 and 708. The emitter collector circuit of the transistor 720 is connected across the input circuit 714, its collector being connected to the positive side of the input circuit 714 through the resistance 710 and its emitter being connected to the outer side of the input circuit through the resistance 721 and ground.

The output of the transistor 716 is transmitted to a transistor 724 whose base is connected to the common connection of the resistance 707 and the collector of the transistor 716. The emitter collector circuit of the transistor 724 is connected across the input circuit 712, its collector being connected to the negative side of the input circuit and its emitter being connected to the other side of the input circuit 712 through the resistance 725 and ground. The output of the transistor 720 is similarly applied to a transistor 727 whose base is connected to the common connection of the resistance 710 and the collector of the transistor 720. The emitter collector circuit of the transistor 727 is connected across the input circuit 714 of the positive voltage, its collector being connected to the positive side of the input circuit and its emitter being connected to the other side thereof by the resistance 728 and ground. A pair of resistances 730 and 731 are connected in series between the common connection of the resistance 725 and the emitter of the transistor 724 and the common connection of the resistance 728 and the emitter of the transistor 727. The output of the two transistors 724 and 727 of the amplifier 24 is thus applied to the base of an output transistor 733 of the amplifier 124, its base being connected to the common connection of the resistances 730 and 731. The emitter of the output transistor is connected to the negative side of the input circuit 712 through the resistance 734 and its collector is connected to the positive side of the input circuit 714.

The output of the amplifier 124 is transmitted to the negative and positive signal rectifiers 125 and 126, the common connection of the resistance 734 and the emitter of the transistor 733 being connected to the base of the transistor 736 of the negative signal rectifier through the resistance 737 and to the base of the transistor 738 of the positive signal rectifier 126 through the resistance 739. The emitter collector circuit of the transistor 736 is connected across the input circuit 712 of negative voltage, its collector being connected to the negative side of the input circuit and its emitter being connected to ground through the resistance 740. The output of the negative signal rectifier 125 is transmitted to the inverter 131, the common connection of the resistance 740 and the emitter of the transistor 736 being connected to the base of the transistor 742 of the inverter through a blocking capacitor 743 and a resistance 744. The base of the transistor 742 is also connected to the common connection of the resistances 746 and 747, the resistance 746 being connected to the negative side of the input circuit 712 and the resistance 747 being connected to the positive side of the input circuit 714 of positive voltage. The emitter of the transistor 742 is connected to the positive side of the input circuit 714 through the parallel resistances 748 and 749 while its collector is connected to the negative side of the input circuit 712 through the resistance 750. The output of the first transistor 742 is applied to the base of the second transistor 752 of the inverter, the common connection of the resistance 750 and the collector of the transistor 742 being connected to the base of the second transistor by the blocking capacitor 753. The base of the second transistor 752 is also connected to the common connection of the resistances 755 and 756, the resistance 755 being connected to the negative side of the input circuit 712 and the resistance 756 being connected to the positive side of the input circuit 714. The collector of the transistor 752 is also connected to the negative side of the input circuit 712 while its emitter is connected to the positive side of the input circuit 714 through the resistance 758.

The output of the inverter 131 is applied to the bases of five amplifying transistors 761–765 whose emitters are connected to the positive side of the input circuit 714 through the resistances 766–780, respectively, and whose collectors are connected to the negative side of the input circuit 712.

The output of the transistor 738 of the positive signal rectifier 126 is transmitted to a transistor 772 through a blocking capacitor 773 connected between the base of the transistor 772 and the common connection of the emitter of the transistor 738 and the resistance 774 which connects the emitter to ground, the collector of the transistor 738 being connected to the positive side of the input circuit 714. The base of the transistor 772 is also connected to the common connection of the resistances 775 and 776 which are connected in series, the resistance 775 being connected to the negative side of the input circuit 712 and the resistance 776 being connected to the positive side of the input circuit 714. The collector of the transistor 772 is connected to the negative side of the input circuit 712 while its emitter is connected to the positive side of the input circuit 714 through the resistance 778.

The output of the transistor 772 is applied to the bases of the five amplifying transistors 781, 782 . . . 785 whose collectors are connected to the negative side of the input circuit 712 and whose emitters are connected to the positive side of the input circuit 714 through the resistances 786, 787 . . . 790, respectively.

The outputs of the amplifying transistors 761–765 and 781–785 are transmitted to the clippers 132 of the output channels 101–120 of the receiver through the commutator 131 which includes ten AND gates 801–810 which when open transmit the outputs of the five amplifying transistors 781–785 to consecutive pairs of the odd number output channels 101, 103 . . . 119, respectively, and ten AND gates 811–820 which when open transmit the outputs of the amplifying transistors 761–765 to consecutive pairs of the even number output channels 102, 104 . . . 120.

The AND gate 801 includes a pair of diodes 821 and 822 connected to the common connection of the resistance 786 and the emitter of the amplifier transistor 781 through a resistance 823. The AND gate 801 is open when a voltage —6 volts is applied to its diode 821, which is connected to the output conductor A of the ring switch 140, to transmit the output of the amplifier transistor 781 to the clipper 132 of the output channel 101. The output of the amplifier transistor 781 is also transmitted to the AND gate 802 through a resistance **823*b* which is connected to the common connection of the diode 821*b* and 822*b* but since the diode 821*b* is connected to the output conductor B of the ring switch 140, the AND gate 802 is open only when the output conductor B of the ring switch 140 is —6 volts. Similarly, the consecutive pairs of AND gates 803 and 804, 805** and 806, 807 and 808 and 809 and 810 have the outputs of the transistors 782, 783, 784 and 785, respectively, applied thereto. Since the AND gates 802–810 are identical in circuity to the AND gate 801, the elements of each of the AND gates 802–810 has been provided with the same reference numerals to which the subscript *b–k*, respectively, have been added as the corresponding elements of the AND gates 801.

The AND gate 811 includes a pair of diodes 827 and 828 whose common connection is connected to the common connection of the resistance 766 and the emitter of the amplifier transistor 761 through a resistance 830. The common connection of the diodes 827*b* and 828*b* of the AND gate 812 is also connected to the common connection of the resistance 766 and the emitter of the transistor 761 through a resistance 830*b*. Each of the AND gates 811 and 812, of course, is open only when the output conductor A or B, respectively, of the ring switch 140 to which it is connected is at −6 volts.

The AND gates 812–820 are identical to the AND gate 811 and accordingly the elements of the AND gates 812–820 have been provided with the same reference numerals to which the subscripts *b–k*, respectively, have been added as the corresponding elements of the AND gate 811. Consecutive pairs of the AND gates 813–820 are connected to the amplifying transistors 762–765 in the same manner as the AND gates 811 and 812 are connected to the amplifying transistor 761.

The ring switch 140 includes ten flip-flop circuits 841*a–k* and corresponding elements of the flip-flop circuits 841*a–k* have been provided with the same reference numerals, to which the subscripts *a–k*, respectively, have been added. Each flip-flop circuit includes a first transistor 842 whose emitter collector circuit is connectable across the input circuit 712, its collector being connected to the negative side of input circuit through the resistance 843 and the emitter collector circuit of the transistor 845 of the ring stepper 144 and its emitter being connected to the other side of the input circuit through the resistance 844 and ground. The emitter collector circuit of the second transistor 846 of each flip-flop circuit is connected across the input circuit 712, its collector being connected to the other side of the input circuit through the diode 850 and the resistance 844. The output of the first transistor of each flip-flop circuit is applied to the base of its second transistor 846, the connection of the resistance 844 and the emitter of the first transistor being connected to the base of the second transistor. The output of the second transistor 846*a* of the first flip-flop circuit 841*a* is applied to the base of the first transistor 842*b* of the second flip-flop circuit 841*b* through a resistance 852 and a capacitor 853. The second transistor of each of the flip-flop circuits 846*b–j* in turn is similarly conected to the first transistor of the next flip-flop circuit. The output of the second transistor 846*k* of the last or tenth flip-flop circuit 841*k* is transmitted to the base of the first transistor 842*a* of the first flip-flop circuit 841*a* through the resistance 852*k* and the capacitor 853*k*. The output conductors A–K of the ring switch are connected to the common connections of the resistances 848*a–k* and the collectors of the second transistors 846*a–k*, respectively, of the ten flip-flop circuits. The common connection of the capacitor 853 and the base of the first transistor 842*a* of the first flip-flop circuit is connected to ground through the resistance 860*a* and the variable resistance 861 while the bases of each of the other first transistors 842*b–k* of the other nine flip-flop circuits are connected to ground through resistances 860*b–k*, respectively, the emitter collector circuit of the transistor 864 of the reset circuit 150 and the variable resistance 861 so that a voltage is applied across the emitter collector circuit of the first transistors 842 when the transistor 845 of the ring stepper 144 is conductive. Each first transistor is conductive when the transistor 845 is conductive except during the cycle immediately following the cycle during which the second transistor of the immediately preceding flip-flop circuit was conductive and causes its associated capacitor 853 to be charged. When the first transistor of a flip-flop circuit 841*a–k* is non-conductive, its second transistor is conductive and a voltage of −6 volts is thus present in its output conductor A–K, respectively.

In order to initiate operation of the ring switch 140 at the time the receiver is first placed in operation, the transistor 864 of the reset circuit 150, which is normally conductive, must be rendered non-conductive to cause the first transistor 842*a* of the first flip-flop circuit 841*a* to be rendered non-conductive. The emitter collector circuit of the transistor 864 is connected across the input circuit 712, its collector being connected to the negative side of the input circuit through the resistance 869 and its emitter being connected to the other side of the input circuit through the resistance 861 and ground. The reset circuit 150 includes a transistor 870 whose emitter collector circuit is connected across an input circuit through a resistance 871 which connects its collector to the negative side of the input circuit 72 and a resistance 872 which connects its emitter to the other side of the input circuit through ground. The base of the transistor 864 is connected to the common connection of the resistance 871 and the collector of the transistor 870. The base of the transistor 870 is connected to ground through a resistance 875.

Resistances 877 and 878 are connected in series with one side of a unijunction transistor 880 across the input circuit 714 of positive voltage. The other side of the unijunctional transistor is connected to the common connection of the resistance 883 and capacitor 884 connected in series across the input circuit 714. The common connection of the resistance 878 and the unijunction transistor is connected to the base of the transistor 870 through a capacitor 885. When a positive voltage is applied across the input circuit 714 by any suitable switch means (not shown) and at the instant the operation of the receiver is initiated, the capacitor 884 is charged and the unijunction transistor 880 is immediately rendered conductive and causes the potential to be applied across the base emitter circuit of the transistor 870 which causes it to be rendered conductive, which in turn causes the transistor 864 to be rendered nonconductive, and thus causes the transistor 842*a* to be non-conductive, and thus initiates operation of the ring switch 140.

In order that the unijunction transistor be conductive only at the time of initiation of operation of the transmitter, a cut-off circuit 890 for the injunction transistor is provided to render it non-conductive after the ring switch 44 is placed in operation. The cut-off circuit includes a transistor 891 whose emitter collector is connected across the input circuit 714 by means of the resistance 883 which connects its collector to the positive side of the input circuit 714 and the resisance 892 which connects its emitter to the other side of the input circuit through ground. A capacitor 893 is connected to the output conductor of one of the flip-flop circuits, for example, the output conductor B, and to ground through the resistance 894 and the diode 895 and also through the diode 896 and the resistance 897. A capacitor 898 is connected across the resistance 897. The common connection of the diode 896 and the resistance 897 is connected to the base of the transistor 891.

It will be apparent that after a predetermined number of cycles of operation of the ring switch the capacitor 898 is charged and renders the transistor 891 of the cut-off circuit 890 conductive since it now short circuits the capacitor 884 and removes the positive biasing potential previously applied to the unijunction transistor and thus causes it to be rendered non-conductive. When the operation of the receiver is stopped by any suitable switch means (not shown) which interrupts the supply of the various voltages to the various voltage input circuits of the receiver, the capacitor 893 discharges through the resistance 894 and the diode 895.

It will now be seen that the ring switch 140 is automatically set in operation whenever voltages are applied across the input circuits 712 and 714 of the receiver at the time the receiver is placed in operation to cause automatic initiation of operation of the ring switch due to the provision of the self start circuit 890 and that the self start circuit is rendered inoperative once the ring switch is placed in operation by the cut-off circuit 890.

The transistor 845 of the ring stepper 844 is momentarily rendered non-conductive immediately prior to the initiation of each train of ten cycles of the carrier wave frequency except the cycle whose first half cycle is modulated by the input of channel 1 of the transmitter, which is of a smaller amplitude than the amplitude of the other nineteen and one half cycles of the train of ten cycles modulated by the inputs of the channels 2–20 of the transmitter, by a signal applied to the base thereof by means of the phase adjust circuit 141 the amplitude discriminator 142 and the inverter 143. The output of the amplifier 124 is transmitted through the capacitor 901 and the variable capacitor 902 of the phase adjust circuit to the base of the transistor 903 of the amplitude discriminator. A resistance **903*a* connects the common connection of the capacitors 901 and 902 to ground. The base of the transistor 903 is also connected to the common connection of the resistance 904 and the pair of resistances 905 and 906 which are connected across the input circuit 712. The emitter collector circuit of the transistor 903 is connected across the input circuit 712, its collector being connected to the negative side of the input circuit 712 through the resistance 908 and its emitter being connected to the other side of the input circuit through the resistance 909 and ground. A capacitor 910 is connected across the resistance 909**.

The output of the amplitude discriminator 142 is transmitted to the first transistor 912 of the trigger 143 through a capacitor 913 and a resistance 914 which connect the common connection of the resistance 908 and the collector of the transistor 902 to the base of the transistor 910. The base of the transistor 912 is also connected to the common connection of the resistances 917 and 918 connected in series across the input circuit 712 through the resistance 914. The emitter collector circuit of the first transistor 912 of the trigger 143 is connected across the input circuit 712 by means of the resistance 720 which connects its collector to the negative side of the input circuit and the resistance 721 which connects its emitter to the other side of the input circuit through ground.

The base of the second transistor 923 of the trigger is connected to the common connection of the resistance 720 and the collector of the first transistor 912 through the resistance 724 and the capacitance 725. The base of the second transistor 923 is also connected to the common connection of the resistance 724 and the resistance 726 which are connected in series with the resistance 720 across the input circuit 712. The emitter collector circuit of the second transistor 923 of the trigger 143 is connected across the input circuit through the resistance 927 which connects its collector to the negative side of the circuit 712 and the resistance 721 which connects its emitter to the other side of the input circuit through ground. The output of the second transistor 923 is applied to the base of the output transistor 930 of the trigger which is connected to the common connection of the resistance 927 and the collector of the second transistor 923. The emitter collector circuit of the output transistor 930 of the trigger 143 is connected to the negative side of the input circuit 712 and its emitter is connected to the other side of the input circuit through the resistance 931 and ground.

The inverter during each train of ten cycles of the input carrier wave produces a square wave pulse during each cycle, except the cycle of the train having the half cycle of low amplitude which is modulated by the channel 1 of the transistor, which momentarily renders the transistor 845 non-conductive at the beginning of each of such nine cycles, the output of the transistor 930 being applied to the base of the transistor 845 through the capacitor 933. A variable resistance 935 is connected between the common connection of the base of the transistor 845 and the capacitor 933 and ground.

The transistor 864 is rendered conductive at the initiation of each cycle of each train of ten cycles of the carrier wave by the signal applied thereto by the synchronizing circuit 139 to permit the first transistor 842 of all of the ten flip-flop circuits to be rendered conductive whenever the second transistor **846*k* of the tenth flip-flop circuit has been conductive during the cycle prior to the first cycle of the train of ten cycles at the initiation of which the transistor 845 of the ring stepper 144 is not rendered momentarily nonconductive by the trigger since the output of the transistor 846*k* causes a capacitor 910*a* of the synchronizing circuit 139 to be properly charged only as long as the transistor 846*k*** is rendered conductive during every tenth cycle of the carrier wave.

The synchronizing circuit 139 causes the ring switch to stop its step by step advance if the cycles of each train of ten cycles of the carrier wave are not applied in proper sequence to the twenty And gates of the commutator 130.

The output conductor K of the ring switch 140 is connected to one side of the capacitor **910*a* through a diode 912*a*, the other side of the capacitor being connected to the base of the transistor 864 through a resistance 914*a*. The common connection of the diode 912*a* and the capacitor 910*a* is connected through the resistance 915*a* to the common connection of a resistance 916*a* and the emitter of the transistor 917*a* of the synchronizing circuit 139. The emitter collector circuit of the transistor 917*a* is connected across the input circuit 712, its collector being connected to the negative side of the input circuit and its emitter being connected to the other side of the input circuit through the resistance 916*a* and ground. The transistor 917*a* is rendered conductive during each cycle of the output of the amplifier 124 by the inverter 148, whose operation in turn is controlled by the trigger 147. The trigger 147 includes a first transistor 920*a* to whose base is applied the output of the amplifier 124, the base being connected to the common connection of the resistance 724 and the emitter of the transistor 733 of the amplifier by a capacitor 921*a*. The base of the transistor is also connected to the common connection of the resistances 922*a* and 923*a* which are connected in series across the input circuit 712. The emitter collector circuit of the first transistor 920*a* of the trigger 144 is also connected across the input circuit 712, its collector being connected to the negative side of the input circuit and its emitter being connected to the other side of the input circuit through the resistance 924*a* and ground. The output of the first trigger transistor 920*a* is applied to the base of the second transistor 926*a* by means of the resistance 927*a* which connects the base of the transistor 926*a* to the common connection of the resistance 924*a* and the emitter of the transistor 920*a*. The emitter collector circuit of the transistor 926*a* is connected across the input circuit 712 by means of the resistance 928*a* which connects its collector to the negative side of the input circuit 712 and the resistance 929*a* which connects its emitter to the other side of the input circuit through ground. The output of the transistor 926*a* is applied to the base of the transistor 931*a* by a resistance 932*a* which connects the common connection of the resistance 928*a* and the collector of the transistor 926*a* to the base of the transistor 931*a*. A capacitor 933*a* is connected across the resistance 932*a*. The base of the transistor 931*a* is connected to ground through a resistance 934*a*. The emitter collector circuit of the transistor 931*a* is connected across the input circuit 712, its collector being connected to the negative side of the input circuit through the resistance 936 and its emitter being connected to the other side of the input circuit through the resistance 929***a* and ground. The output of the transistor 931*a* is applied to the base of the transistor 938 by a resistance 939 which connects the base of the transistor 938 to the common connection of the resistance 936 and the collector of the transistor 931*a*. A capacitor 940 is connected across the resistance 939. The collector of the transistor 938 is connected to the negative side of the input circuit 712 through a resistance 742 and its emitter is connected to the other side of the input circuit through the Zener diode 944 and ground. A resistance 945 is connected between the negative side of the input circuit 712 and the common connection of the Zener diode 944 and the emitter of the transistor 938. The output of the inverter transistor 938 is applied to the base of the transistor 917*a* which is connected to the common connection of the resistance 942 and the collector of the transistor 938. The transistor 917*a* is thus rendered conductive during each cycle of the carrier wave and renders the transistor 864 conductive at the beginning of each cycle of the carrier wave. As long as the operation of the ring switch is properly synchronized with the carrier wave so that each twentieth cycle having a lower amplitude than the other nineteen half cycles of each train of ten cycles of the carrier wave, modulated by the input of channel 1 of the transmitter, is transmitted to the output channel 101 of the receiver and the second transistor 846*a* is conductive.

If at the initiation of operation of the receiver the first flip-flop circuit is actuated at some cycle other than the first cycle of each train of ten cycles of the carrier wave, the capacitor 910*a* will not be properly charged and at the instant that the transistor 845 is not rendered non-conductive at the initiation of such first cycle of the train of the carrier wave, for example, at the cycle immediately following the cycle in which the second transistor 846*b* of the second flip-flop circuit 841*b* of the ring switch is conductive, the transistor 864 is rendered non-conductive and thus causes the first transistor 842*a* of the first flip-flop circuit 841*a* to be rendered non-conductive. At the same time the second transistors, 846*b–k* of the flip-flop circuits 841*b–k* are rendered or held non-conductive since the bases of the first transistors 842*b–k* are biased by the full negative voltage of the input circuit 712 through the resistances 860*b–k* and are conductive while the transistor 842*a* of the first flip-flop circuit is rendered non-conductive since it is now connected to ground through the resistances 860*a* and 861 and the transistor 864 is non-conductive. The ring switch thus causes the And gates 801–820 to be consecutively opened to transmit the modulated consecutive half cycles of each train of ten cycles of the carrier wave to the clippers 132 of the output circuit or channels 101–120, respectively, of the receiver.

The clipper 132 of the output channel 101 includes a transistor 950 whose base is connected by a capacitor 951 to the common connection of the diode 822 of the And gate 801 and a resistance 952 whose opposite end is connected to a source of negative voltage E1. The emitter collector circuit of the clipper transistor 950 is connected across the input circuit 714 of positive voltage, its collector being connected to the positive side of the input circuit through a resistance 954 and its emitter being connected to the other side of the input circuit through a resistance 955. The common connection of the base of the transistor and the capacitor 951 is connected to ground by a resistance 957. The output of the clipper transistor 950 is applied through a capacitor 959 to the base of the transistor 960 of the amplifier transistor 133. The base of the transistor is also connected to ground through the resistance 962 while its collector is connected to the positive side of the input circuit 714. The emitter of the amplifier transistor 960 is connected to ground through a low pass amplifier 134 which includes a pair of inductances 964 and 965 connected in series with a resistance 966 between the emitter 960 and ground. The low pass filter also includes a capacitor 968 connected across the first inductance, a capacitor 970 connected between ground and the common connection of the emitter and the first inductance 964, a capacitor 971 connected between ground and the common connection of the inductances 964 and 965, and a capacitor 972 connected between ground and the common connection of the inductance 965 and the resistance 966.

The output of the low pass filter 134 is applied to an amplifier transistor 975 whose base is connected to the common connection of the second inductance 965, the resistance 966 and the capacitor 972. The collector of the output transistor 975 is connected to the positive side of the input circuit 714 of positive voltage while the emitter is connected to a source of negative voltage by a resistance 976. The output circuit 101 includes an output conductor 977 connected to the common connection of the resistance 976 and the emitter 975 and the other side of the output channel 101 is connected to ground.

Each of the other And gates 802–820 of the commutator 130 are similarly connected to their input circuits 102–120 through a clipper, an amplifier and a low pass filter identical to those illustrated and described in connection with the And gate 801 and the output channel 101 of the transmitter and accordingly will not be described in detail. The resistances 952*b*–952*t* which are connected to the diodes 822*b–k* and 828*b–k* of the other And gates 802–820 of the commutator are connected to a source of negative voltage E2 which is of greater negative voltage than the negative voltage of the source E1 to which the resistance 952 of the And gate 801 is connected in order to provide a greater degree of amplification to the output of And gate 801 since the amplitude of the half cycle transmitted by the And gate 801 is substantially smaller than the amplitude of the other nineteen half cycles of each train of ten cycles of the carrier wave transmitted by the other nineteen And gates of the commutator 130.

It will now be seen that a new and improved communication system for simultaneously transmitting and receiving a plurality of signals by means of a single carrier wave has been illustrated and described which includes a transmitter having a plurality of output channels and a receiver having a plurality of output channels, the transmitter and receiver having means for connecting the input channels to predetermined output channels in a predetermined sequence.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A communications system including: a transmitter having a generator for generating a basic predetermined frequency, a plurality of input channels, a pair of intermediate mixers, means for sequentially connecting predetermined one of said input channels to one of said pairs of mixers for modulating alternate half cycles of excursions in one direction of polarity of said basic frequency with the output of said predetermined ones of said input channels and for connecting sequentially other predetermined ones of said input channels to the other of said pair of mixers for modulating alternate half cycles of the excursions in the opposite direction of polarity of the basic frequency with the outputs of the others of said input channels, and a final mixer connected to said intermediate mixers in which the outputs of said intermediate mixers are combined to form consecutive trains each of a predetermined number of full cycles of the basic frequency of a carrier wave whose half cycles are modulated by the input signals of said input channels in predetermined sequence, one of said input channels having a predetermined characteristic whereby the half cycle of each train of the carrier wave carrying the signal of said one of said input channels provides a synchronizing signal; and a receiver having a plurality of output channels and an input circuit connectable to the output of said final mixer of said transmitter, said receiver including means responsive to said synchronizing signal for transmitting the signals of said input channels carried by each train of said carrier wave to said output channels in predetermined sequence whereby the signal outputs of said transmitter are sequentially transmitted to predetermined output channels of said receiver.

2. A communication system including: a transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others said input channels, and a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers.

3. A communication system including: a transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others said input channels, a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers, said last mentioned means energizing said mixers and low pass filters of each of said input channels with a continuous frequency during the period during which the input channels are not connected to their mixers by said switch means.

4. A communication system including: a transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others said input channels, and a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers, said last mentioned means energizing said mixers and low pass filters of each of said input channels with a continuous frequency during the period during which the input channels are not connected to their mixers by said switch means, said switch means including a plurality of pairs of AND gates, each of said AND gates when rendered conductive connecting its associated input channel to its initial mixer, and AND gate of each pair of AND gates being capable of being rendered conductive only during the half cycles of excursions in one direction of polarity of the basic frequency and the other AND gate of each pair of AND gates being capable of being rendered conductive only during the half cycles of excursions in the opposite direction of polarity of the basic frequency, and a ring switch for energizing the pairs of AND gates sequentially during consecutive cycles of the basic frequency to cause one AND gate of each pair of AND gates to be conductive during one half of the cycle during which the pair of AND gates is energized by said ring switch and to cause the other AND gate to be rendered conductive during the other one half of the cycle.

5. A communication system including: a transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others of said input channels, and a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers, said last mentioned means energizing said mixers and low pass filters of each of said input channels with a continuous frequency during the period during which the input channels are not connected to their mixers by said switch means, said switch means including a plurality of pairs of And gates, each of said And gates when rendered conductive connecting its associated input channel to its initial mixer, one And gate of each pair of And gates being capable of being rendered conductive only during the half cycles of excursions in one direction of polarity of the basic frequency and the other And gate of each pair of And gates being capable of being rendered conductive only during the half cycles of excursions in the opposite direction of polarity of the basic frequency, and a ring switch for energizing the pairs of And gates sequentially during consecutive cycles of the basic frequency to cause one And gate of each pair of And gates to be conductive during one half of the cycle during which the pair of And gates is energized by said ring switch and to cause the other And gate to be rendered conductive during the other one half of the cycle, and means for initiating operation of said ring switch.

6. A communication system including: A transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others of said input channels, and a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers, said last mentioned means energizing said mixers and low pass filters of each of said input channels with a continuous frequency during the period during which the input channels are not connected to their mixers by said switch means, said switch means including a plurality of pairs of And gates, each of said And gates when rendered conductive connecting its associated input channel to its initial mixer, one And gate of each pair of And gates being capable of being rendered conductive only during the half cycles of excursions in one direction of polarity of the basic frequency and the other And gate of each pair of And gates being capable of being rendered conductive only during the half cycles of excursions in the opposite direction of polarity of the basic frequency, and a ring switch for energizing the pairs of And gates sequentially during consecutive cycles of the basic frequency to cause one And gate of each pair of And gates to be conductive during one half of the cycle during which the pair of And gates is energized by said ring switch and to cause the other And gate to be rendered conductive during the other one half of the cycle, and means for initiating operation of said ring switch, and means for rendering said last mentioned means inoperative after said ring switch is placed in operation.

7. A communication system including: a transmitter having a generator for generating a basic predetermined frequency, a plurality of input channels, a pair of intermediate mixers, means for sequentially connecting predetermined ones of said input channels to one of said pairs of mixers for modulating alternate half cycles of excursions in one direction of polarity of said basic frequency with the outputs of said predetermined ones of said input channels and for connecting sequentially other predetermined ones of said input channels to the other of said pair of mixers for modulating alternate half cycles of the excursions in the opposite direction of polarity of the basic frequency with the outputs of the others of said input channels, the outputs of said intermediate mixers being modulated half cycles of sine wave form of excursions of opposite polarity, and a final mixer connected to said intermediate mixers in which the outputs of said intermediate mixers are combined to form consecutive trains each of a predetermined number of full cycles of the basic frequency of a carrier wave whose half cycles are modulated by the input signals of said input channels in predetermined sequence, one of said input channels having a predetermined characteristic whereby the half cycle of each train of the carrier wave carrying the signal of said one of said input channels provides a synchronizing signal; and a receiver having a plurality of output channels and an input circuit connectable to the output of said final mixer of said transmitter, said receiver including means responsive to said synchronizing signal for transmitting the signals of said input channels carried by each train of said carrier wave to said output channels in predetermined sequence whereby the signal outputs of said transmitter are sequentially transmitted to predetermined output channels of said receiver.

8. The communication system of claim 7 wherein said means of said receiver for transmitting the signals of said input channels to said output channels in predetermined sequence includes switch means comprising a plurality of pairs of And gates, each of said And gates when rendered conductive connecting said input circuit of said receiver to its associated output channel, one And gate of each pair of And gates being capable of being rendered conductive only during the half cycles of excursions in one direction of polarity of the carrier wave and the other And gate of each pair of said And gates being capable of being rendered conductive only during the half cycles of excursions in the opposite direction of polarity of the carrier wave, and a ring switch for energizing the pairs of And gates sequentially in predetermined order during each train of said carrier wave.

9. The communication system of claim 7 wherein said means of said receiver for transmitting the signals of said input channels to said output channels in predetermined sequence includes switch means comprising a plurality of pairs of And gates, each of said And gates when rendered conductive connecting said input circuit of said receiver to its associated output channel, one And gate of each pair of And gates being capable of being rendered conductive only during the half cycles of excursions in one direction of polarity of the carrier wave and the other And gate of each pair of said And gates being capable of being rendered conductive only during the half cycles of excursions in the opposite direction of polarity of the carrier wave, and a ring switch for energizing the pairs of And gates sequentially in predetermined order during each train of said carrier wave, said receiver ring switch including a plurality of flip flop circuits responsive to said carrier wave, said flip flop circuits being actuated in sequence in each train of said carrier wave, and means operatively associated with said receiver ring switch and responsive to said synchronizing signal of said carrier wave for causing said flip flop circuits of said receiver ring switch to operate in predetermined sequence during each train of said carrier wave.

10. The communication system of claim 7 wherein said means of said receiver for transmitting the signals of said input channels to said output channels in predetermined sequence includes switch means comprising a plurality of pairs of And gates, each of said And gates when rendered conductive connecting said input circuit of said receiver to its associated output channel, one And gate of each pair of And gates being capable of being rendered conductive only during the half cycles of excursions in one direction of polarity of the carrier wave and the other And gate of each pair of said And gates being capable of being rendered conductive only during the half cycles of excursions in the opposite direction of polarity of the carrier wave, and a ring switch for energizing the pairs of And gates sequentially in predetermined order during each train of said carrier wave, said receiver ring switch including a plurality of flip flop circuits responsive to said carrier wave, said flip flop circuits being actuated in sequence in each train of said carrier wave, and means operatively associated with said receiver ring switch and responsive to said synchronizing signal of said carrier wave for causing said flip-flop circuits of said receiver ring switch to operate in predetermined sequence during each train of said carrier wave, said last mentioned means including means for initiating operation of said ring switch upon the initiation of operation of said receiver and means for rendering said initiating means inoperative when said ring switch is in operation.

11. A communication system including: a transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others of said input channels, and a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers, said last mentioned means energizing said mixers and low pass filters of each of said input channels with a continuous frequency during the period during which the input channels are not connected to their mixers by said switch means, said switch means including a plurality of pairs of AND gates, each of said AND gates when rendered conductive connecting its associated input channel to its initial mixer, one AND gate of each pair of AND gates being capable of being rendered conductive only during the half cycles of excursions in one direction of polarity of the basic frequency and the other AND gate of each pair of AND gates being capable of being rendered conductive only during the half cycles of excursions in the opposite direction of polarity of the basic frequency, and a ring switch for energizing the pairs of AND gates sequentially during consecutive cycles of the basic frequency to cause one AND gate of each pair of AND gates to be conductive during one half of the cycle during which the pair of AND gates is energized by said ring switch and to cause the other AND gate to be rendered conductive during the other one half of the cycle, said ring switch including a plurality of flip flop circuits responsive to said basic frequency, said flip flop circuits being actuated in predetermined sequence during successive cycles of said basic frequency.

12. A communication system including: a transmitter having means for generating a basic frequency; a plurality of input channels, each of said input channels having a mixer, a low pass filter, and a rectifier for producing half cycles of excursions of predetermined polarity of the basic frequency modulated with the signal input of the input channel; switch means for sequentially connecting the input channels to their mixers in predetermined sequence; a first intermediate mixer connectable to predetermined ones of said input channels having an output of excursions of one polarity, a second intermediate mixer connectable to others of said rectifiers having an output of excursions of the opposite polarity, one of said intermediate mixers producing a train of half cycles of excursions of one polarity modulated sequentially by the outputs of predetermined ones of said input channels and the other of said intermediate mixers producing consecutive trains of half cycles of excursions of opposite polarity modulated by the signals of predetermined others of said input channels, and a final mixer connected to said intermediate mixers for producing a carrier wave of a sine wave form having consecutive trains of cycles whose consecutive half cycles are modulated by the input signals of said input channels in predetermined sequence; and means energized by said basic frequency for synchronizing operation of said mixers, said last mentioned means energizing said mixers and low pass filters of each of said input channels with a continuous frequency during the period during which the input channels are not connected to their mixers by said switch means, said switch means including a plurality of pairs of AND gates, each of said AND gates when rendered conductive connecting its associated input channel to its initial mixer, one AND gate of each pair of AND gates being capable of being rendered conductive only during the half cycles of excursions in one direction of polarity of the basic frequency and the other AND gate of each pair of AND gates being capable of being rendered conductive only during the half cycles of excursions in the opposite direction of polarity of the basic frequency, and a ring switch for energizing the pairs of AND gates sequentially during consecutive cycles of the basic frequency to cause one AND gate of each pair of AND gates to be conductive during one half of the cycle during which the pair of AND gates is energized by said ring switch and to cause the other and gate to be rendered conductive during the other one half of the cycle, said ring switch including a plurality of flip flop circuits responsive to said basic frequency, said flip flop circuits being actuated in predetermined sequence during successive cycles of said basic frequency, means operatively associated with said transmitter ring switch for initiating operation of said transmitter ring switch upon the initiation of operation of said transmitter, and means for renderng said initiating means inoperative when said ring switch is placed in operation.

13. A receiver including a plurality of output channels; an input circuit energizable by a carrier wave, alternate half cycles of consecutive trains of cycles of the carrier wave being modulated by signals from different sources, a predetermined one of the half cycles of each train of the waves being of different amplitude than the other half cycles to provide a synchronizing signal; and means responsive to said synchronizing signal for transmitting said modulation signals of the half cycles of each train of the carrier wave to predetermined output channels in predetermined sequence; said means for transmitting the modulation signals of said carrier wave to said output channels including switch means comprising a plurality of pairs of And gates, each of said And gates when rendered conductive connecting said input circuit of said receiver to its associated output channel, one And gate of each pair of And gates being capable of being rendered conductive only during the half cycle of excursions in one direction of polarity of the carrier wave and the other And gate of each pair of said And gates being capable of being rendered conductive only during the half cycles of excursions in the opposite directions of polarity of the carrier wave, and a ring switch for energizing the pairs of And gates sequentially in predetermined order during successive cycles of each train of said carrier wave.

14. The receiver of claim 13, wherein said ring switch includes a plurality of flip flop circuits responsive to said carrier wave, said flip flop circuits being actuated in sequence during each train of said carrier wave and means operatively associated with said ring switch and responsive to said synchronizing signal of said carrier wave for causing said flip flop circuits of said ring switch to operate in predetermined sequence during each train of carrier wave.

15. The receiver of claim 13, wherein said ring switch includes a plurality of flip flop circuits responsive to said carrier wave, said flip flop circuits being actuated in sequence during each train of said carrier wave and means operatively associated with said ring switch and responsive to said synchronizing signal of said carrier wave for causing said flip flop circuits of said ring switch to operate in predetermined sequence during each train of carrier wave, means for initiating operation of said ring switch upon the initiation of operation of said receiver; and means for rendering said initiating means inoperative when said ring switch is in operation.

16. The system of claim 2 wherein said switch means includes a plurality of gate means, each of said gate means when rendered conductive connecting its associated input channel to its initial mixer, and a switch for energizing said gate means sequentially during consecutive cycles of the basic frequency.

17. A receiver including: a plurality of output channels; an input circuit energizable by a carrier wave, alternate half cycles of consecutive trains of cycles of the carrier wave being modulated by signals from different sources, a predetermined one of the half cycles of each train of the waves being of different amplitude than the other half cycles to provide a synchronizing signal; and means responsive to said synchronizing signal for transmitting said modulation signals of the half cycles of each train of the carrier wave to predetermined output channels in predetermined sequence, said means for transmitting the modulation signals of said carrier wave to said output channels including switch means comprising a plurality of gate means, each of said gate means when rendered conductive connecting said input circuit of said receiver to its associated output channel, and a switch for energizing said gate means sequentially in predetermined order during successive cycles of each train of said carrier wave.

References Cited

UNITED STATES PATENTS

| | | |
|---|---|---|
| 3,013,147 | 12/1961 | Guerth. |
| 2,907,830 | 10/1959 | Boutry et al. |
| 2,877,290 | 3/1959 | LeBlan. |
| 2,523,703 | 9/1950 | Larson et al. |

RALPH D. BLAKESLEE, *Primary Examiner.*

U.S. Cl. X. R.

328—117; 340—172; 343—203